(12) United States Patent
Kakimoto et al.

(10) Patent No.: US 7,599,265 B2
(45) Date of Patent: Oct. 6, 2009

(54) RECORDING METHOD, RECORDING APPARATUS, AND SIGNAL PROCESSING CIRCUIT FOR RECORDING INFORMATION ON OPTICAL RECORDING MEDIUM

(75) Inventors: Hiroya Kakimoto, Gunma (JP); Mitsuo Sekiguchi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 823 days.

(21) Appl. No.: 11/026,613

(22) Filed: Dec. 30, 2004

(65) Prior Publication Data

US 2005/0169139 A1    Aug. 4, 2005

(30) Foreign Application Priority Data

Jan. 5, 2004 (JP) ............................. 2004-000242
Jan. 28, 2004 (JP) ............................. 2004-019925

(51) Int. Cl.
*G11B 5/09* (2006.01)
*G11B 7/09* (2006.01)

(52) U.S. Cl. ................ 369/47.53; 369/47.5; 369/59.11; 369/116

(58) Field of Classification Search ........................ None
See application file for complete search history.

(56) References Cited

U.S. PATENT DOCUMENTS 6,859,426 B1   2/2005  Ogawa et al.
6,912,188 B2 *  6/2005  Morishima ............... 369/47.53

FOREIGN PATENT DOCUMENTS

| EP | 0 905 685 A1 | 3/1999 |
|---|---|---|
| JP | 05-028495 | 2/1993 |
| JP | 10-134355 | 5/1998 |
| JP | 11-149641 | 6/1999 |
| JP | 2000-260048 | 9/2000 |
| JP | 2001-143263 | 2/2001 |
| JP | 2001-060320 | 3/2001 |
| JP | 2002-319130 | 10/2002 |
| JP | 2003-157534 | 5/2003 |
| WO | WO 98/10419 | 3/1998 |

* cited by examiner

*Primary Examiner*—Muhammad N. Edun
(74) *Attorney, Agent, or Firm*—Knobbe Martens Olson & Bear LLP

(57) ABSTRACT

In a recording method or apparatus, in order to set an optimal recording condition by a minimal number of times of testing, test recording is carried out while changing power and pulse width of recording pulses in a stepwise manner. Conditions for the test recording are concentrated in a region of a matrix defined by power×pulse width.

9 Claims, 17 Drawing Sheets

FIG. 7
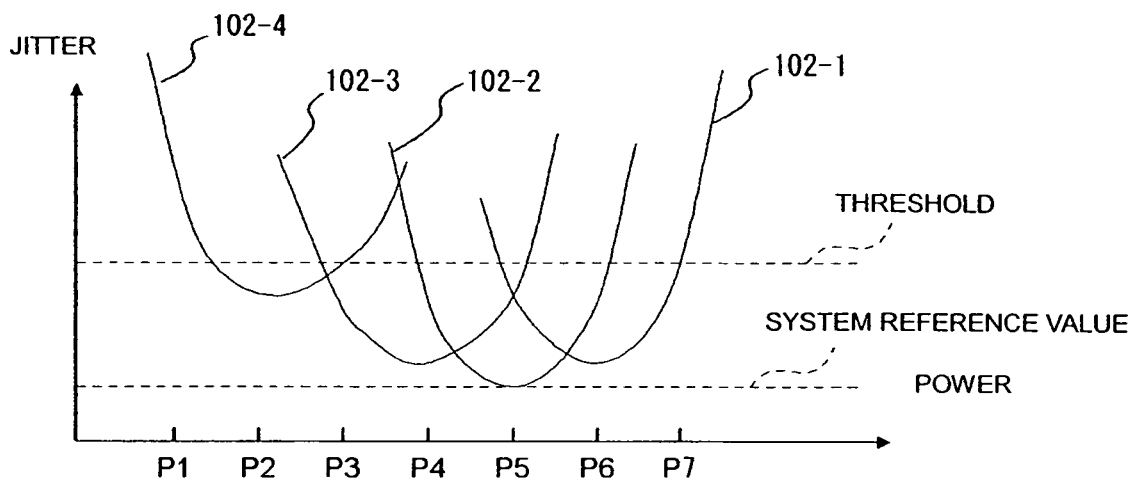
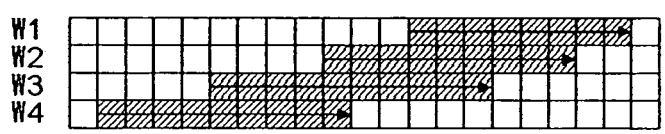
FIG. 8A
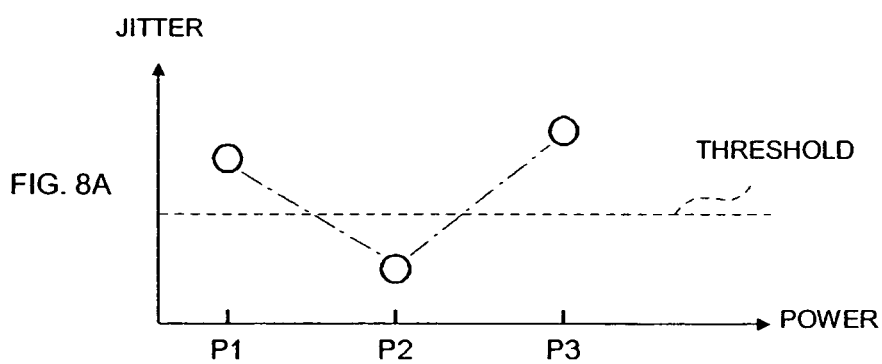
FIG. 8B
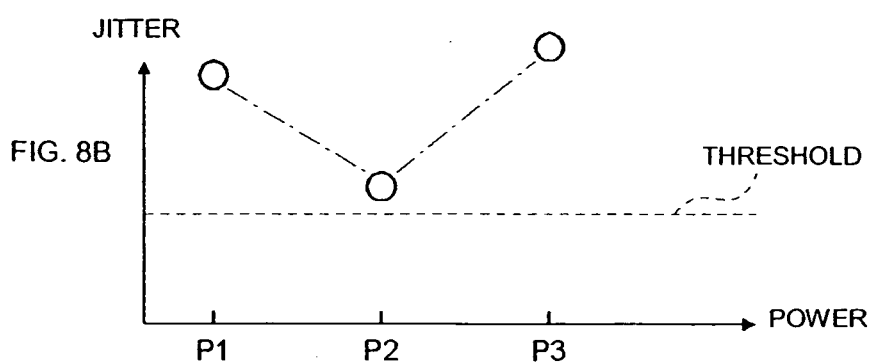

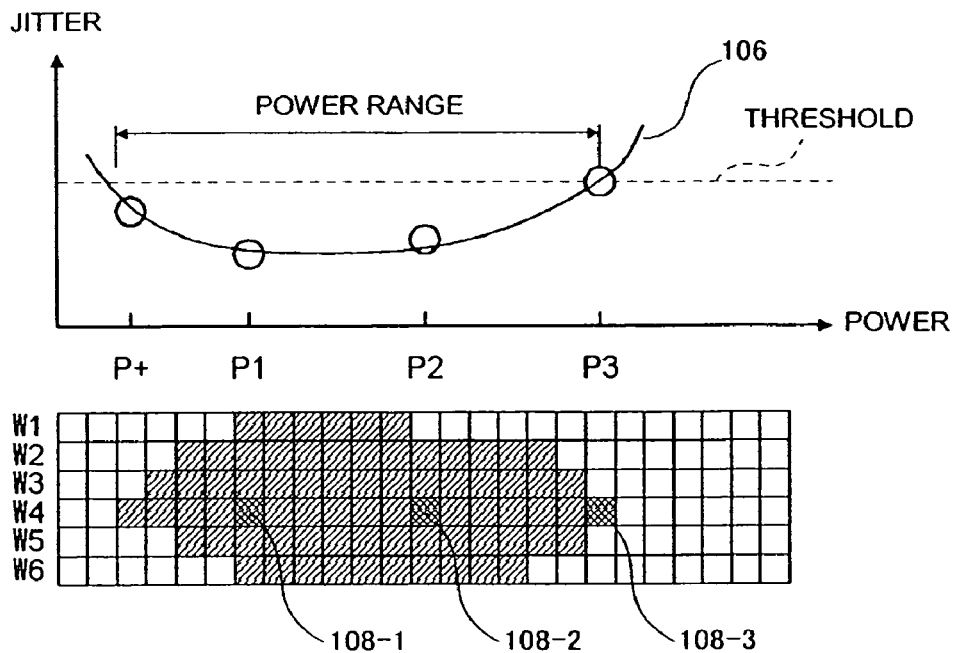

| Pattern | Shape | Relationship with threshold | Predicted recording characteristics | Pulse width |
|---|---|---|---|---|
| 1 | Arbitrary | Maximum jitter ≤ Threshold | Same sensitivity | ±0.2T |
| 2 | Valley | Minimum jitter ≤ Threshold | Same sensitivity | ±0.1T |
| 3 | Valley | Minimum jitter > Threshold | Same sensitivity but much difference in media characteristics | ±0.2T |
| 4 | Right-decreasing | Minimum jitter ≤ Threshold | Somewhat lower than reference medium | +0.1T, +0.2T |
| 5 | Right-decreasing | Minimum jitter > Threshold | Much lower than reference medium | +0.2T, +0.4T |
| 6 | Right-increasing | Minimum jitter ≤ Threshold | Somewhat higher than reference medium | −0.1T, −0.2T |
| 7 | Right-increasing | Minimum jitter > Threshold | Much higher than reference medium | −0.2T, −0.4T |
| 8 | Mountain | Maximum jitter > Threshold | Not available | ±0.2T |

FIG. 17
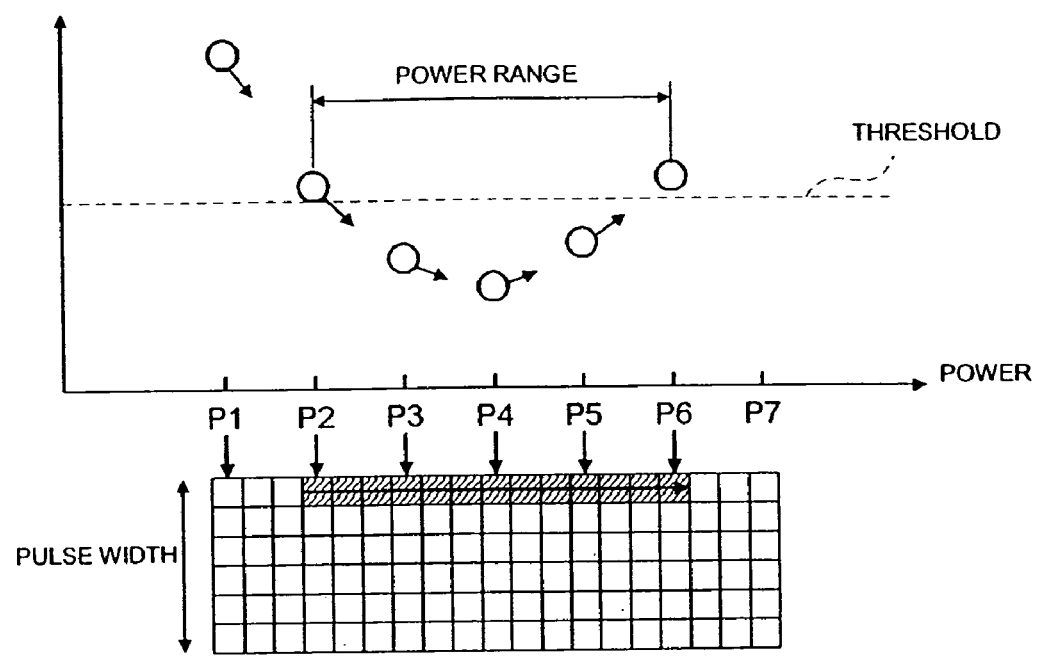
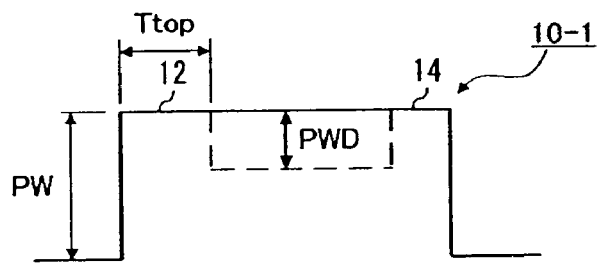
FIG. 18A
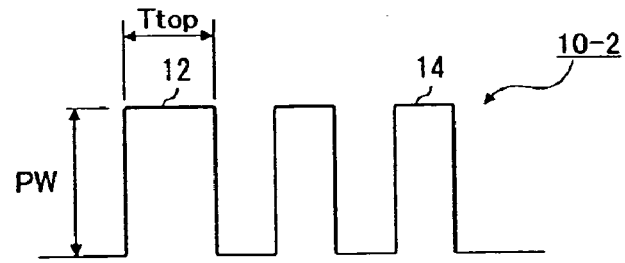
FIG. 18B

RECORDING METHOD, RECORDING APPARATUS, AND SIGNAL PROCESSING CIRCUIT FOR RECORDING INFORMATION ON OPTICAL RECORDING MEDIUM

BACKGROUND OF THE INVENTION

1. Field of the Invention

The present invention relates to a method and an apparatus for recording information onto an optical recording medium such as an optical disk. More specifically, the present invention relates to a method and an apparatus that are effective to set an optimal recording condition by a smaller number of times of test recording for determining a recording condition.

2. Description of the Related Art

When information is recorded on an optical recording medium such as a CD-R or a DVD-R, matching between a medium on which information is to be recorded and a recording apparatus (hereinafter referred to as a drive) used for recording depends on individual combination. This is due to factors relating to the medium, such as variation in optimal recording condition due to difference in the type of recording material of the medium or due to variation that occurs in film formation during manufacturing, and due to factors relating to the drive, such as variation in optimal recording condition due to variation that occurs in assembly during manufacturing or due to difference in the type of pickup or semiconductor laser included in the drive. Actually, a recording condition that is suitable for each combination of a medium and a drive is determined by a combination of these factors.

Thus, according to a conventional method, test recording is carried out using a combination of medium and drive that is actually used for recording, and a recording condition with which most favorable recording quality is achieved is selected.

Recording condition is mainly controlled based on the power of laser with which a medium is irradiated (hereinafter referred to as power) and the width of recording pulses (hereinafter referred to as pulse width). Thus, in order to find an accurate optimal condition, it is ideal to test all the combinations of power and pulse width. However, a test recording area provided on a medium is restricted and increase in the number of times of testing affects a size of area to be used by a user or the number of additional recording operation available. Thus, it is desired to find an optimal recording condition by a minimum number of times of testing.

Thus, conventionally, ID information that allows a drive to identify the type of medium is stored in the medium itself, and test conditions prepared in advance for individual media types are stored in the drive. When information is actually recorded, ID information of a medium loaded onto the drive is read from the medium, and a test condition associated with the ID information is used.

FIG. 31 is a schematic diagram showing features of a method for determining a test condition based on ID information stored on a medium. As shown in FIG. 31, in which a range of test condition is expressed by a matrix image of a combination of power and pulse width of recording pulse 10, the method uses test conditions in which the power is changed gradually while the pulse width is fixed.

FIG. 32 is a schematic diagram showing playback characteristics obtained by the conventional method shown in FIG. 31. As shown in FIG. 32, when power is changed by the conventional method shown in FIG. 31, playback characteristics to be obtained, such as jitter values, are represented by a characteristics curve having a pole at a certain power value, and the minimum value is selected as an optimal recording condition. This method is most generally used to determine a test condition, and improvements of this method have been proposed as described below.

FIG. 33 is a schematic diagram showing features of a method disclosed in Japanese Patent No. 3024282. As shown in FIG. 33, according to the method, a range for changing power is restricted based on a temperature of an optical disk, or based on information regarding an optimal recording condition, that are recorded in advance on an optical disk. This method is effective to reduce the number of times of testing.

According to the method, however, matching between an optical disk on which information is to be recorded and a drive used for recording is not actually examined. Since information that serves as a basis for restricting test range is estimated information such as temperature, the probability that an optimal condition exists in the restricted test range is low, so that the method is not sufficient to find an optimal condition by a small number of times of testing. Furthermore, similarly to the conventional method described earlier, an optimal condition could be missed because it is a method in which only the power is changed.

FIG. 34 is a schematic diagram showing features of methods disclosed in Japanese Unexamined Patent Application Publications No. 2000-36115, No. 2000-182244, and No. 2003-203343. These methods focus on changing pulse width, and pulse width is changed while the power is fixed.

According to these methods, however, since pulse width is changed within a wide range, the number of times of testing is not sufficiently reduced. Furthermore, since test recording is carried out with the power fixed, the methods are not sufficient to find an optimal condition.

As a method effective to reduce testing time, paragraph [0030] of Japanese Patent No. 3024282 describes " . . . with the same configuration shown in FIG. 1, it is possible to use a wide range of test conditions for the first test recording and determine an optimal recording condition with a low precision, and then determine an optimal recording condition at a higher precision at each time of test recording until desired recording quality is obtained or an optimal recording condition of a desired precision is found. This is effective to reduce the length of time needed to find an optimal recoding condition when optimal recording condition considerably varies depending on combination of optical disk recording apparatus and optical disk, and optimal recording condition must be determined at a high precision." This method, however, only repeats testing at different precisions. Thus, unless playback quality is checked at the first time of test recording, the number of times of testing is not sufficiently reduced even if playback quality is tested at the second time of testing.

SUMMARY OF THE INVENTION

In view of the situation described above, it is an object of the present invention to provide a recording method and a recording apparatus that are effective to set an optimal recording condition by a small number of times of test recording.

In order to achieve the object, according to an aspect of the present invention, a recording method for recording information onto an optical recording medium with a recording condition determined based on a result of test recording carried out by irradiating the optical recording medium with pulses of laser beams is provided. The test recording is carried out while changing a power of the laser beams in a stepwise manner, and a range of changing the power is determined based on a result of checking recording characteristics prior to the test recording.

The test recording may be carried out while changing a pulse width in a stepwise manner and changing the power in a stepwise manner for each value of the pulse width changed.

The recording characteristics may be checked by carrying out test recording on the optical recording medium with a plurality of predetermined reference conditions and detecting a result of reproduced characteristics.

The range of changing the power may be determined based on a difference between a larger power value and a smaller power value at two points that satisfy a playback criterion. The larger and smaller power values being derived based on results of approximating the recording characteristics of the optical recording medium using a plurality of playback values obtained by detecting the playback characteristics.

The range of changing the power may be determined based on a difference between a larger power value and a smaller power value at two points that are most approximate to a playback criterion among a plurality of playback values obtained by detecting the playback characteristics.

The range of changing the power may be set based on a power value at a pole of change in the playback characteristics.

According to another aspect of the present invention, a recording method for recording information onto an optical recording medium with a recording condition determined based on a result of test recording carried out by irradiating the optical recording medium with pulses of laser beams is provided. The test recording is carried out while changing a pulse width in a stepwise manner, and a range of changing the pulse width is determined based on a result of checking recording characteristics prior to the test recording.

The test recording may be carried out while changing a power of the laser beams in a stepwise manner and changing the pulse width in a stepwise manner for each value of the power changed.

According to another aspect of the present invention, a recording apparatus for recording information onto an optical recording medium with a recording condition determined based on a result of test recording carried out by irradiating the optical recording medium with pulses of laser beams is provided. The test recording is carried out while changing a power of the laser beams in a stepwise manner, and a range of changing the power is determined based on a result of checking recording characteristics prior to the test recording.

According to another aspect of the present invention, a recording apparatus for recording information onto an optical recording medium with a recording condition determined based on a result of test recording carried out by irradiating the optical recording medium with pulses of laser beams is provided. The test recording is carried out while changing a pulse width in a stepwise manner, and a range of changing the pulse width is determined based on a result of checking recording characteristics prior to the test recording.

According to another aspect of the present invention, a signal processing circuit that is to be included in a recording apparatus for recording information onto an optical recording medium with a recording condition determined based on a result of test recording carried out by irradiating the optical recording medium with pulses of laser beams is provided. The signal processing circuit includes a section for carrying out test recording while changing a power of the laser beams in a stepwise manner; and a section for determining a range of changing the power based on a result of checking recording characteristics prior to the test recording.

According to another aspect of the present invention, a signal processing circuit that is to be included in a recording apparatus for recording information onto an optical recording medium with a recording condition determined based on a result of test recording carried out by irradiating the optical recording medium with pulses of laser beams is provided. The signal processing circuit includes a section for carrying out test recording while changing a pulse width in a stepwise manner; and a section for determining a range of changing the pulse width based on a result of checking recording characteristics prior to the test recording.

According to another aspect of the present invention, a recording method for recording information onto an optical recording medium with a recording condition determined based on a result of test recording carried out by irradiating the optical recording medium with pulses of laser beams is provided. The recording method includes the step of checking recording characteristics prior to the test recording. The number of times of recording during the test recording is changed based on a result of checking the recording characteristics.

The change in the number of times of recording may involve a change in a power condition of the laser beams and/or a change in a pulse condition.

The recording characteristics may be checked by irradiating the optical recording medium with pulses of laser beams by at least two sets of recording condition that differ in a power condition of the laser beams and/or a pulse condition.

According to another aspect of the present invention, a recording method for recording information onto an optical recording medium with a recording condition determined based on a result of test recording carried out by irradiating the optical recording medium with pulses of laser beams is provided. The test recording is carried out while changing a power of the laser beams in a stepwise manner, and the number of times the power is changed is determined based on a result of checking recording characteristics prior to the test recording.

The test recording may be carried out while changing a pulse width in a stepwise manner and changing the power in a stepwise manner for each value of the pulse width changed.

The recording characteristics may be determined by carrying out test recording on the optical recording medium by a plurality of predetermined recording conditions and detecting a result of reproduced characteristics.

The number of times the power is changed may be determined based on a difference between a larger power value and a smaller power value at two points that satisfy a playback criterion. The larger and smaller power values are derived based on results of approximating the recording characteristics of the optical recording medium using a plurality of playback values obtained by detecting the playback characteristics.

The number of times the power is changed may be determined based on relationship between a playback criterion and results of approximating the recording characteristics of the optical recording medium using a plurality of playback values obtained by detecting the playback characteristics.

The number of times the power is changed may be determined based on a difference between a larger power value and a smaller power value at two points that are most approximate to a playback criterion among a plurality of playback values obtained by detecting the playback characteristics.

The number of times the power is changed may be determined based on relationship between a playback criterion and two points that are most approximate to the playback criterion among a plurality of playback values obtained by detecting the playback characteristics.

A range of changing the power may be set based on a power value at a pole of change in the playback characteristics.

The number of times the power is changed may be determined based on relationship between a predetermined playback criterion and a plurality of playback values obtained by detecting the playback characteristics, and the number of times is changed by additional recording with a recording condition that is different from a recording condition used to check the recording characteristics.

According to another aspect of the present invention, a recording method for recording information onto an optical recording medium with a recording condition determined based on a result of test recording carried out by irradiating the optical recording medium with pulses of laser beams is provided. The test recording is carried out while changing a pulse width in a stepwise manner, and the number of times the pulse width is changed is determined based on a result of checking recording characteristics prior to the test recording.

The test recording may be carried out while changing a power of the laser beams in a stepwise manner and changing the pulse width in a stepwise manner for each value of the power changed.

According to another aspect of the present invention, a recording apparatus for recording information onto an optical recording medium with a recording condition determined based on a result of test recording carried out by irradiating the optical recording medium with pulses of laser beams is provided. The test recording is carried out while changing a power of the laser beams in a stepwise manner, and the number of times the power is changed is determined based on a result of checking recording characteristics prior to the test recording.

According to another aspect of the present invention, a recording apparatus for recording information onto an optical recording medium with a recording condition determined based on a result of test recording carried out by irradiating the optical recording medium with pulses of laser beams is provided. The test recording is carried out while changing a pulse width in a stepwise manner, and the number of times the pulse width is changed is determined based on a result of checking recording characteristics prior to the test recording.

According to another aspect of the present invention, a signal processing circuit that is to be included in a recording apparatus for recording information onto an optical recording medium with a recording condition determined based on a result of test recording carried out by irradiating the optical recording medium with pulses of laser beams is provided. The signal processing circuit includes a section for carrying out test recording while changing a power of the laser beams in a stepwise manner; and a section for determining the number of times the power is changed, based on a result of checking recording characteristics prior to the test recording.

According to another aspect of the present invention, a signal processing circuit that is to be included in a recording apparatus for recording information onto an optical recording medium with a recording condition determined based on a result of test recording carried out by irradiating the optical recording medium with pulses of laser beams is provided. The signal processing circuit includes a section for carrying out test recording while changing a pulse width in a stepwise manner; and a section for determining the number of times the pulse width is changed, based on a result of checking recording characteristics prior to the test recording.

As described above, according to the present invention, a condition for test recording is determined based on a result of checking recording characteristics prior to the test recording. Thus, it is possible to find, by a smaller number of times of testing, a recording condition suitable for a combination of medium and drive that are actually used.

BRIEF DESCRIPTION OF THE DRAWINGS

FIG. 7 is a schematic diagram showing an example relating to the flow shown in FIG. 5.

FIGS. 8A and 8B are schematic diagrams showing examples where valley patterns are obtained as results of testing recording characteristics in step S20 shown in FIG. 4.

FIG. 13 is a schematic diagram showing an example of determining a test region in step S22 shown in FIG. 4 when a right-increasing pattern is obtained in step S20.

FIG. 14 is a table showing an example where eight patterns are used in step S20 shown in FIG. 4.

FIG. 17 is a schematic diagram showing an example where a power range used in step S22 shown in FIG. 4 is determined by sampling.

FIGS. 18A and 18B are schematic diagrams showing examples of pulse patterns used in test recording in step S24 shown in FIG. 4.

DESCRIPTION OF THE PREFERRED EMBODIMENTS

Features of test recording, which constitute main features of the present invention, will be described followed by overview and detail of preferred embodiments of the present invention.

Figure 1:
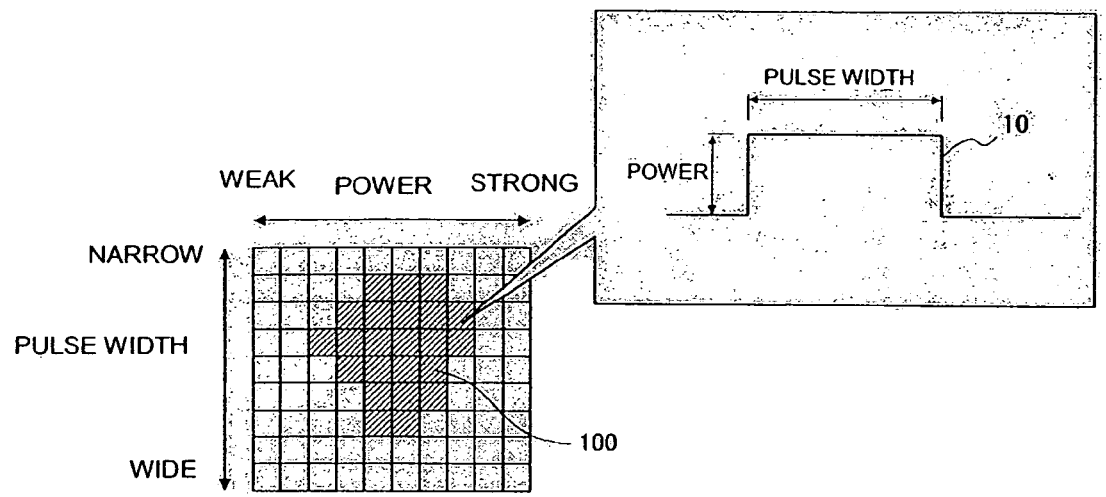
FIG. 1 is a schematic diagram showing features of test conditions according to an embodiment of the present invention.

FIG. 1 is a schematic diagram showing features of test recording according to an embodiment of the present invention. As shown in FIG. 1, according to this embodiment, test recording is carried out while changing power and pulse width of recording pulse 10 in a stepwise manner. A region of test conditions used in test recording (hereinafter referred to as a "test region"), when represented by a matrix image of power×pulse width, for example, is a region 100 concentrated at a part of the matrix as shown in FIG. 1.

The reason for concentrating test conditions at a part is that optimal conditions can be found by a smaller number of times of test recording where the probability of existence of suitable recording conditions is high.

Figure 2:
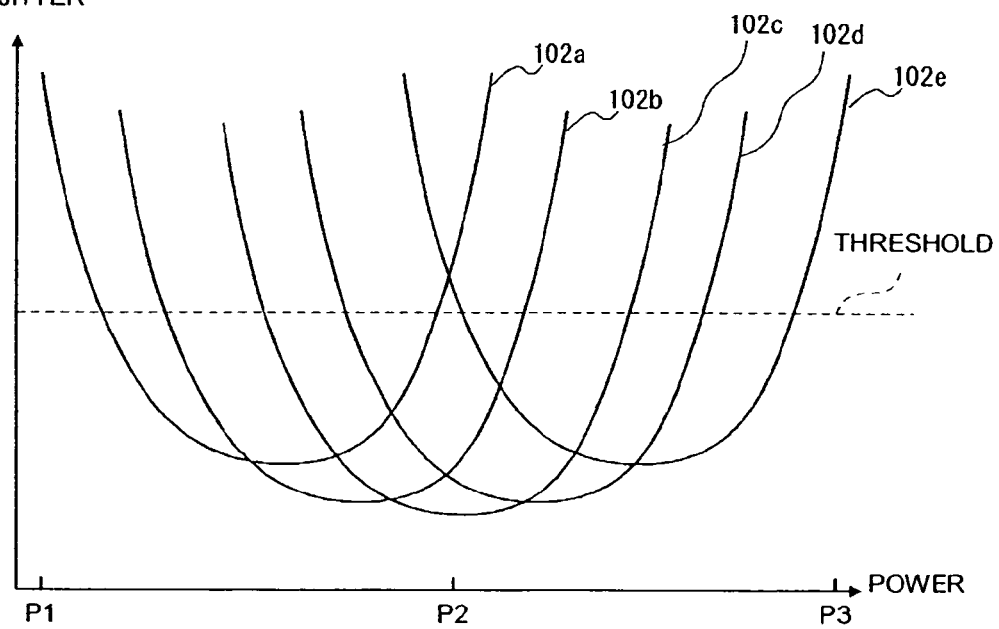
FIG. 2 is a diagram showing jitter characteristics in relation to change in power and pulse width.

FIG. 2 is a diagram showing jitter characteristics in relation to change in power and pulse width. As shown in FIG. 2, pulse width, which is a recording condition, is changed as a, b, c, d, and e, and power is changed continuously in a range of P1 to P3 for each of the pulse widths a, b, c, d, and e, whereby jitter characteristics 102a to 102e represent different characteristic curves for the respective pulse widths are obtained.

With regard to minimum values of the respective jitter characteristics 102a to 102e, i.e., the poles of the characteristic curves, in this example, the jitter characteristics 102c obtained by changing power with the pulse width has lowest jitter value, so that it is understood that this value is most desirable among the jitter characteristics 102a to 102e.

Thus, in the example shown in FIG. 2, power P2 and pulse width c, with which jitter is minimized, are optimal condition, so that this embodiment is directed to find these conditions by a minimum number of times of testing. Thus, in this embodiment, a threshold of jitter is set, and a region in which the threshold is not exceeded is estimated by testing recording characteristics prior to test recording, a region with a high probability is selected as a test region, and the test region is tested with focus, so that optimal conditions are found by a small number of times of testing.

Figure 3:
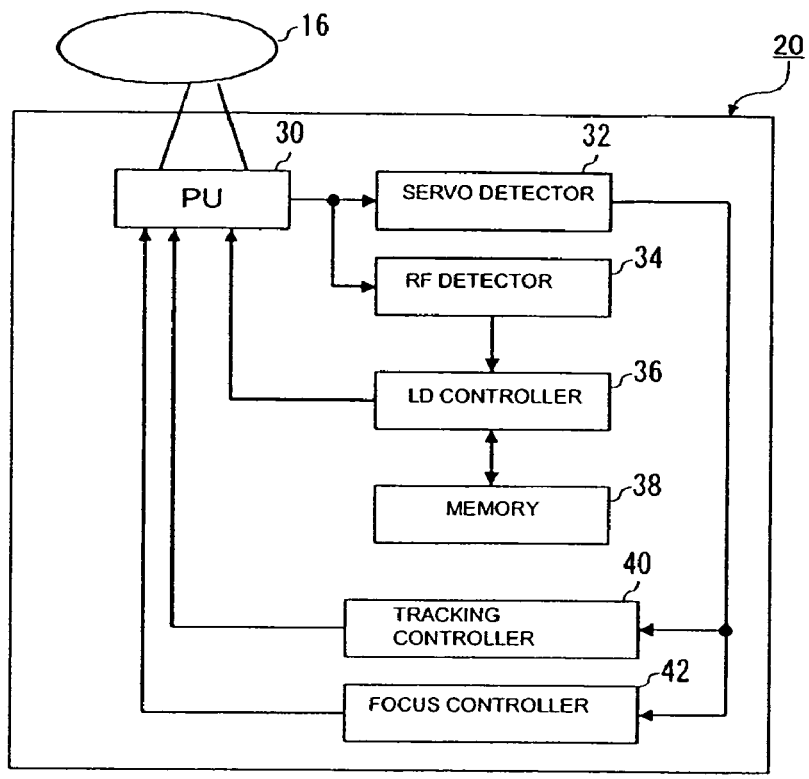
FIG. 3 is a block diagram showing an optical information recording medium and the overall construction of an optical information recording apparatus according to an embodiment of the present invention.

FIG. 3 is a block diagram showing the overall construction of a recording system including a medium and a drive according to an embodiment of the present invention. As shown in FIG. 3, the recording system includes a drive 20 according to this embodiment, and a medium 16 for recording by the drive 20. The medium 16 is an optical information recording medium, for example, a dye-based medium such as a CD-R or a DVD-R, or a phase-change medium such as a CD-RW or a DVD-RW.

As shown in FIG. 3, the drive 20 includes a pickup 30 that forms an optical system for irradiating the medium 16 with laser beams, a servo detector 32 for detecting geometric information such as a control position of the pickup 30, an RF detector 34 for detecting an RF signal obtained by the pickup 30, an LD controller 36 for controlling a laser diode provided in the pickup 30, a memory 38 storing control conditions or the like of the LD controller 36, a tracking controller 40 for controlling tracking of the pickup 30 based on the result of detection by the servo controller 32, and a focus controller 42 for controlling focusing of the pickup 30.

The components of the drive 20 are described in patent documents mentioned earlier and are well known to those skilled in the art, so that detailed descriptions thereof will be omitted herein.

Among the components, the LD controller 36 and the memory 38 particularly relate to test recording, which constitutes a main feature of this embodiment. The LD controller 36 outputs a parameter for a laser beam for irradiating the medium 16 therewith, i.e., recording pulse 10 shown in FIG. 1, to the pickup 30, thereby controlling recording condition. The memory 38 stores a pulse pattern of the recording pulse 10 and other conditions.

Figure 4:
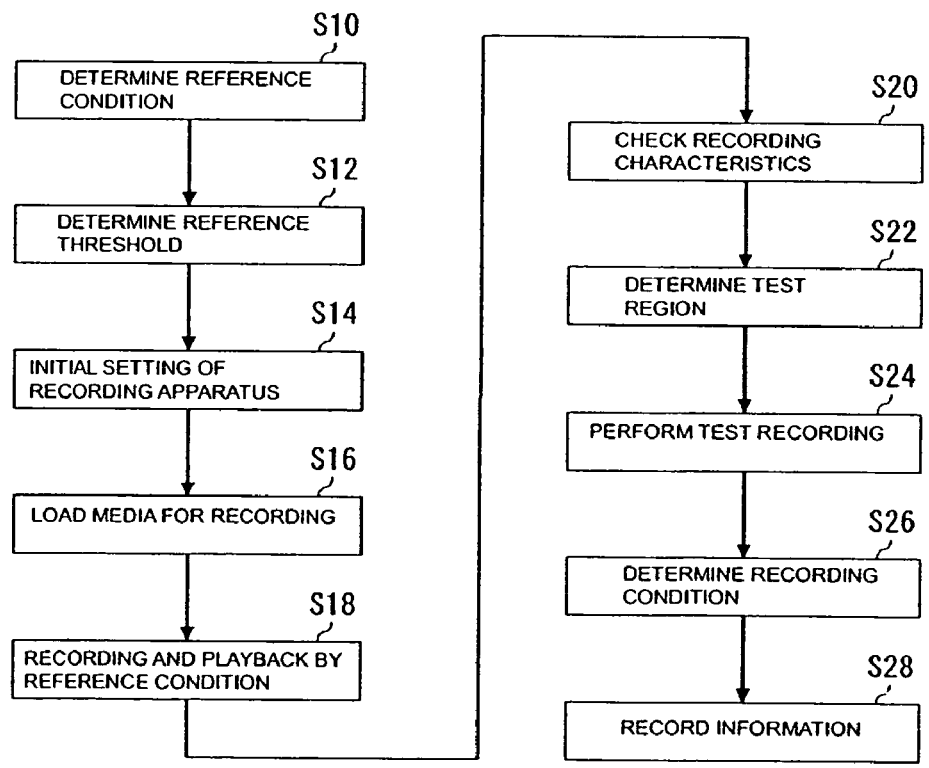
FIG. 4 is a flowchart showing a procedure that is executed by a drive according to the embodiment.

FIG. 4 is a flowchart showing a procedure that is executed by the drive 20 according to this embodiment. As shown in FIG. 4, the drive 20 executes steps S10 to S14 to make initial setting of the drive 20. Then, the drive 20 executes steps S16 to S22 to determine a condition for test recording. Then, the drive 20 executes step S24 to execute test recording by the condition determined. Then, the drive 20 executes step S26 to determine a condition for actual recording based on the result of the test recording. Then, the drive 20 executes step S28 to record information on the medium 16 by the condition determined. Now, these steps will be described in more detail.

Determining Reference Condition

In step S10 shown in FIG. 4, test recording is carried out while changing recording speed using a standard medium, thereby obtaining one pulse width and three power values as reference conditions. Preferably, the three power values are a power value with which jitter is minimized as a result of the test recording and two power values above and below of that power value. Preferably, the two power values are values in the vicinity of a threshold that serves as a reference for determining a result of jitter test. These reference conditions are used for later testing of recording characteristics.

Determining Reference Threshold

As described earlier, it is supposed in this embodiment that a region where a jitter threshold is not exceeded is set as a most probable test region, so that the jitter threshold that serves as a reference must be determined. The threshold may be a standard value determined in advance in accordance with the type of the drive or medium. However, the threshold representing a minimum line of an allowable region of jitter varies depending on the status of the pickup 30 or other components shown in FIG. 3, and also varies depending on the recording speed for the medium.

Thus, preferably, the threshold is also determined on the basis of a combination of a drive and a medium that are actually used so that a more appropriate reference will be used and a more appropriate test region will be set.

It is to be noted, however, that setting a threshold on the basis of a combination of a drive and a medium causes an increase in the number of recording steps. Thus, alternatively, a threshold that is suitable for an individual drive may be stored in the memory 38 at the time of manufacturing, assuming that variation among individual drives is a main factor of variation in the threshold.

Figure 5:
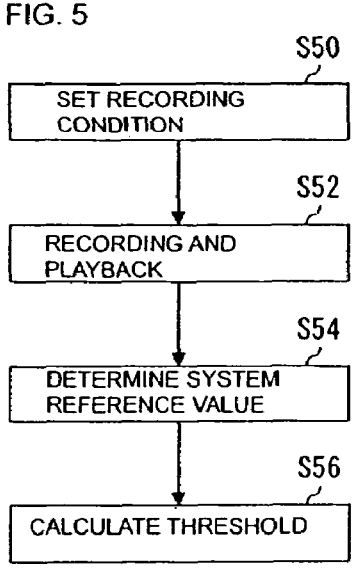
FIG. 5 is a flowchart showing details of a step of determining a reference threshold, shown in FIG. 4.

FIG. 5 is a flowchart showing details of the step of determining a reference threshold, shown in FIG. 4. As shown in FIG. 5, to determine a reference threshold, recording and playback are carried out based on a predetermined recording condition, a reference value for the system is determined based on the result, and a value obtained by setting a predetermined margin to the reference value is used as a threshold for determining a test region. Now, these steps will be described in order.

In step S50, a recording condition is set. In step S50, a predetermined number of patterns of conditions needed for recording and playback, such as pulse width, power, recording and playback speed, and recording address, are prepared, and the recording conditions are set to the drive 20. Then, a reference medium is loaded in the drive 20. Preferably, a medium having standard characteristics among various media is chosen as the reference medium.

In step S52, recording and playback are carried out using the reference medium loaded, based on the recording conditions set in step S50, thereby obtaining recording and playback characteristic values by the respective recording conditions, such as jitter. As the characteristic value, a value representing recording quality is obtained.

In step S54, an optimal value, for example, a minimum value of jitter, is selected as a system reference value from the recording and playback characteristic values obtained in step S52. Thus, a jitter value that is presumably approximate to the optimal value for the drive 20 is set as a reference value. The reference value need not be an optimal point of jitter, and may be an intermediate point of two points crossing a predetermined threshold, i.e., an intermediate value of power margin.

In step S56, the system reference value determined in step S54 is multiplied by a predetermined coefficient ax (preferably, $\alpha > 1$) to calculate a threshold. Thus, a predetermined margin is provided with respect to the system reference value. That is, the threshold is calculated by multiplying the system reference value by $\alpha$, where $\alpha$ is preferably about 1.5. The coefficient $\alpha$ is set suitably in accordance with the type of the drive or medium used. The coefficient $\alpha$ may be set in a range of 0.8 to 1.2 so that the threshold will be close to the system reference value, or in a range of 2.0 to 3.0 so that the threshold will be larger.

Figure 6:
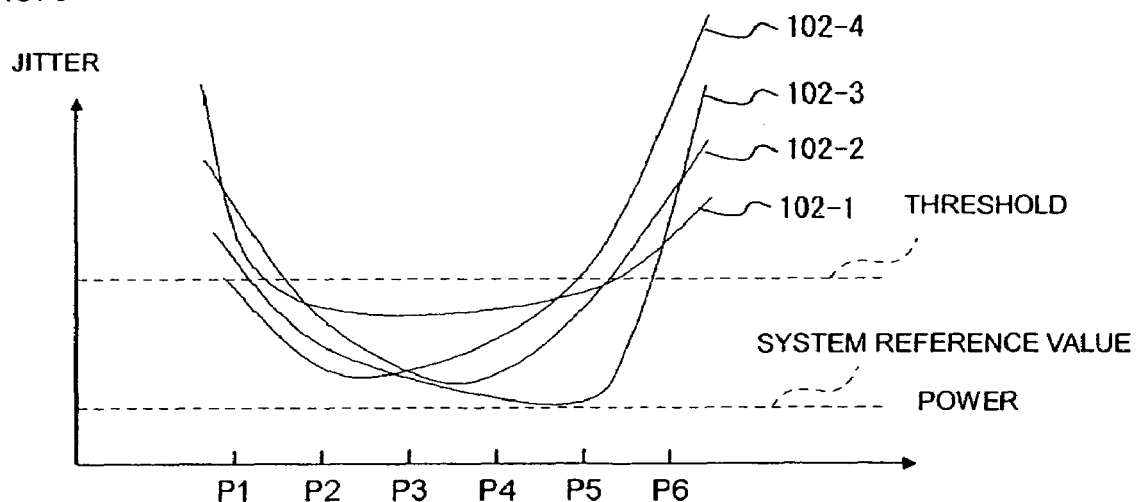
FIG. 6 is a schematic diagram showing an example relating to the flow shown in FIG. 5.

FIG. 6 is a schematic diagram showing an example relating to the flow shown in FIG. 5. In the example shown in FIG. 6, a jitter value is used as a characteristic value representing recording quality, and the value of power is changed from P1 to P6 for each of pulse widths W1 to W4, thereby obtaining playback characteristics 102-1 to 102-4. In the example shown in FIG. 6, the pulse widths W1 to W4 and the power values P1 to P6 are used as recording conditions. The pole of the playback characteristics 102-3 with which jitter value is minimized is used as a system reference value, and a value obtained by multiplying the system reference value by, for example, 1.5 is used as a threshold. The arrows in the matrix image shown in FIG. 6 indicate directions of changing test conditions. This also applies to the subsequent figures.

FIG. 7 is a schematic diagram showing an example relating to the flow shown in FIG. 5. In the example shown in FIG. 7, a jitter value is used as a characteristic value representing recording quality, and the range of changing power value is varied among the pulse widths W1 to W4, thereby obtaining playback characteristics 102-1 to 102-4. In the example shown in FIG. 7, the pole of the playback characteristics 102-2 with which the jitter value is minimized is used as a system reference value, and a value obtained by multiplying the system reference value by, for example, 1.5 is used as a threshold. As described above, a threshold may be determined using different power conditions for respective pulse widths.

Initial Setting of Recording Apparatus

In step S14, the reference condition and the reference threshold obtained in steps S10 and S12 shown in FIG. 4 are stored in the memory 38 of the drive 20. Preferably, step S14 is executed at the time of manufacturing of the drive 20.

Loading of Recording Medium

Then, in step S16, the medium 16 for recording information thereon is loaded in the drive 20 in which initial setting has been completed in step S14.

Recording and Playback by Reference Condition

Then, in step S18, recording is carried out on the medium 16 loaded in step S16, by the conditions set in step S14. More specifically, jitter values at three points are obtained by carrying out recording and playback three times using the single pulse width and three power values defined as reference conditions. The recording characteristics in relation to combinations of the drive 20 and the medium 16 can be understood by plotting the jitter values at the three points along a power axis.

Testing of Recording Characteristics

FIGS. 8A and 8B are schematic diagrams showing examples where valley patterns are obtained as results of testing recording characteristics in step S20 shown in FIG. 4. As shown in FIGS. 8A and 8B, recording characteristics are tested using the jitter values and threshold for the respective reference conditions obtained in the preceding steps. In the examples shown in FIGS. 8A and 8B, power values P1, P2, and P3 are used as reference conditions, and a virtual line connecting jitter values obtained in relation to the respective power values forms a valley pattern. When such a valley pattern is obtained, it is indicated that the reference medium used in step S10 and the recording medium loaded in step S16 have substantially the same sensitivity and similar recording characteristics.

FIG. 8A shows an example where the minimum value of the valley pattern is not larger than the threshold, and FIG. 8B shows an example where the minimum value of the valley pattern is not smaller than the threshold. In either case, it is presumed that the reference medium and the recording medium have substantially the same sensitivity. When the reference medium and the recording medium have substantially the same sensitivity, a condition used for test recording is set as a surface area defined by power×pulse width around the reference condition, as described later.

In FIGS. 8A and 8B, the difference between a playback value and a playback reference value obtained at each of the recording points P1, P2, and P3, i.e., the difference between the jitter value and the jitter threshold in the examples shown in FIGS. 8A and 8B, differs. More specifically, the playback value is closer to the playback reference value in FIG. 8A than in FIG. 8B.

This indicates that it is easier to find an optimal condition in the example shown in FIG. 8A than in the example shown in FIG. 8B. Thus, testing may be carried out smaller number of times in the example shown in FIG. 8A than in the example shown in FIG. 8B, finding an optimal solution by a smaller number times of testing.

That is, when the difference between the playback value and the playback reference value is small, the optimal condition becomes closer to the reference condition. On the other hand, when the difference between the playback value and the playback reference value is large, the optimal condition becomes more remote from the reference condition. Thus, when it is desired to decrease the number of times of testing, the number of times of testing is preferably changed in accordance with the difference between the playback value and the reference playback value.

Figure 9A:
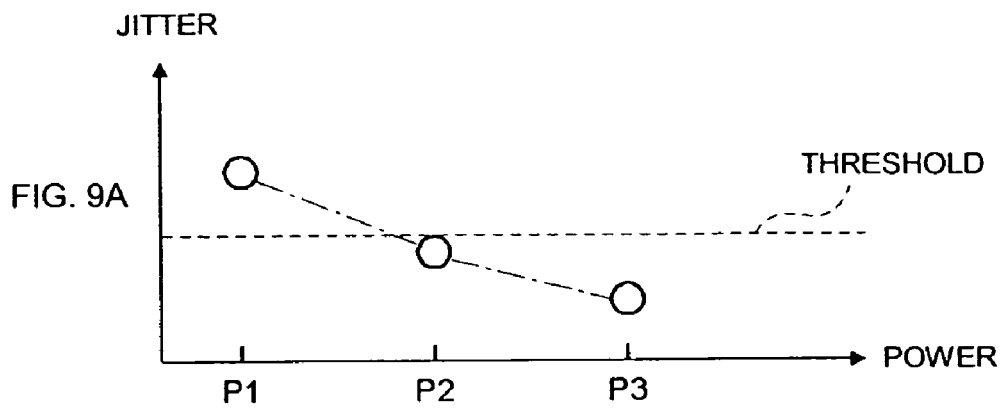
FIGS. 9A and 9B are schematic diagrams showing examples where right-decreasing patterns are obtained as results of testing recording characteristics in step S20 shown in FIG. 4.
Figure 9B:
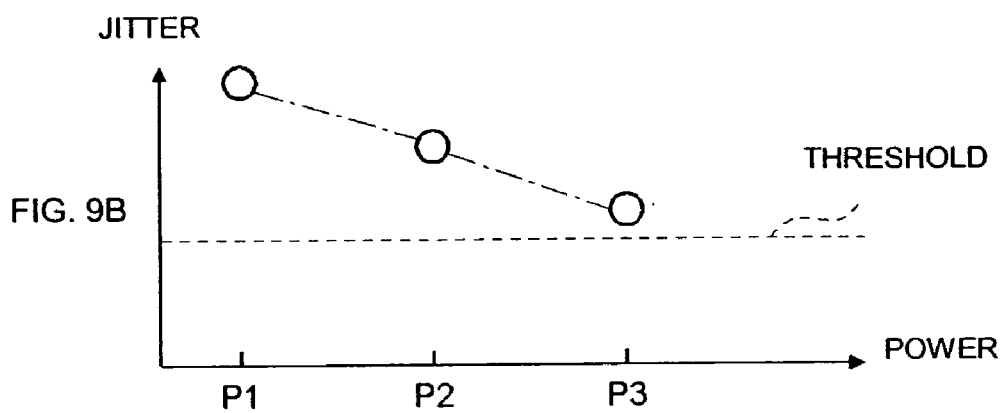

FIGS. 9A and 9B are schematic diagrams showing examples where right-decreasing patterns are obtained as results of testing recording characteristics in step S20 shown in FIG. 4. In the examples shown in FIGS. 9A and 9B, right-decreasing patterns are obtained, in which the jitter value decreases as the power value increases as P1, P2, and P3. When such a right-decreasing pattern is obtained, it is indicated that the sensitivity of the recording medium is lower than the sensitivity of the reference medium.

FIG. 9A shows an example where the minimum value of the right-decreasing pattern is not larger than the threshold, and FIG. 9B shows an example where the minimum value of the right-decreasing pattern is not smaller than the threshold. In either case, it is presumed that the sensitivity of the recording medium is lower than the sensitivity of the reference medium. When the sensitivity of the recording medium is lower, a test region defined by a surface area of power×pulse width around the reference condition is shifted to the side of high power and wide pulse width for test recording, as will be described later.

Furthermore, when such a right-decreasing pattern shown in FIGS. 9A and 9B is obtained, the minimum value of jitter presumably exists on the side of high power, so that additional writing may be performed at a power higher than P3 to check recording characteristics again. In this case, although the number of times of recording increases by one, the precision of testing of recording characteristics is improved. When such a pattern is obtained, similarly to the case where a valley pattern is obtained, the number of times of testing may be changed in accordance with the difference between playback value and playback reference value.

Furthermore, when such a right-decreasing pattern shown in FIGS. 9A and 9B is obtained, presumably, the optimal solution becomes more remote from the reference condition than in the valley patterns shown in FIGS. 8A and 8B, so that the number of times of testing is preferably being increased than in the case of the valley patterns.

Figure 10A:
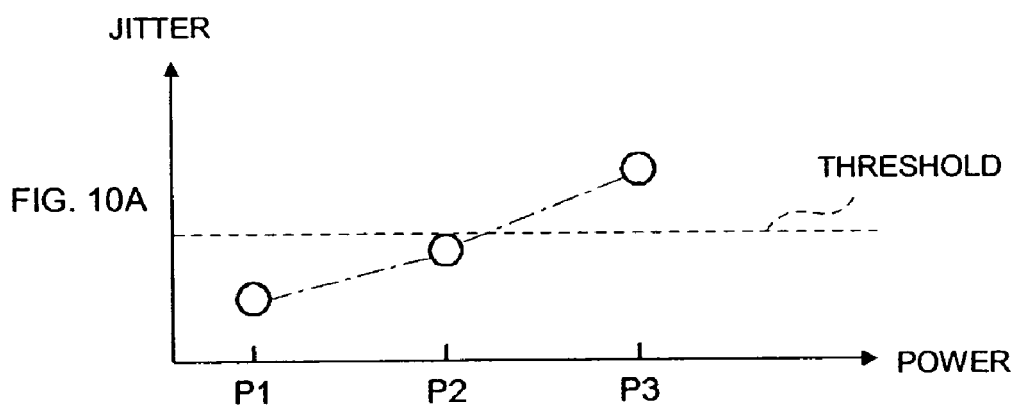
FIGS. 10A and 10B are schematic diagrams showing examples where right-increasing patterns are obtained as results of testing recording characteristics in step S20 shown in FIG. 4.
Figure 10B:
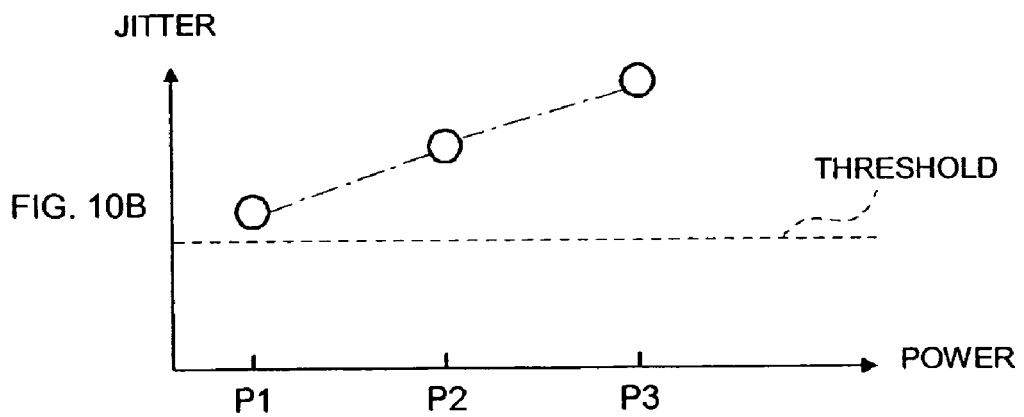

FIGS. 10A and 10B are schematic diagrams showing examples where right-increasing patterns are obtained as results of testing recording characteristics in step S20 shown in FIG. 4. In the examples shown in FIGS. 10A and 10B, right-increasing patterns are formed in which the jitter value increases as the power value increases as P1, P2, and P3. When such right-increasing patterns are obtained, it is indicated that the sensitivity of the recording medium is higher than the sensitivity of the reference medium.

FIG. 10A shows an example where the minimum value of the right-increasing pattern is not larger than the threshold, and FIG. 10B shows an example where the minimum value of the right-increasing pattern is not smaller than the threshold. In either case, it is presumed that the sensitivity of the recording medium is higher than the sensitivity of the reference medium. When the sensitivity of the recording medium is higher, a test region defined by a surface area of power×pulse width around the reference condition is shifted to the side of low power and narrow pulse width for test recording, as will be described later.

Furthermore, when such right-increasing patterns shown in FIGS. 10A and 10B are obtained, the minimum value of jitter presumably exists on the side of low power, so that additional writing may be performed at a power lower than P1 to check recording characteristics again. In this case, although the number of times of recording is increased by one, the precision of testing of recording characteristics is improved. When such patterns are obtained, similarly to the case where the valley patterns are obtained, the number of times of testing may be changed in accordance with the difference between playback value and playback reference value.

Furthermore, when such right-increasing patterns shown in FIGS. 10A and 10B are obtained, presumably, the optimal solution becomes more remote from the reference condition than in the valley patterns shown in FIGS. 8A and 8B. Thus, preferably, the number of times of testing is increased compared with the case of the valley patterns.

Determining Test Region

Figure 11:
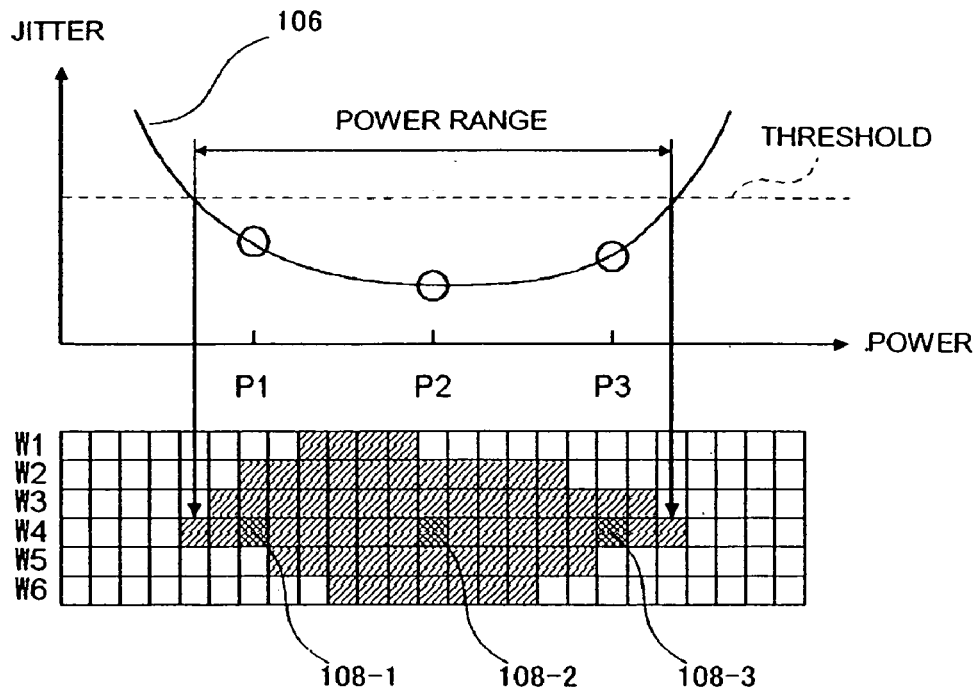
FIG. 11 is a schematic diagram showing an example of determining a test region in step S22 shown in FIG. 4 when a valley pattern is obtained in step S20.

FIG. 11 is a schematic diagram showing an example where a test region is determined in step S22 in a case where a valley pattern is obtained in step S20 shown in FIG. 4. As shown in FIG. 11, when a valley pattern is obtained, the power value for test recording is changed in a power range defined by cross points between the threshold and an approximated curve 106 drawn by jitter values obtained for P1, P2, and P3, respectively. In this embodiment, a "power range" is defined as a range of power that is actually used in test recording, and a "power margin" is defined as a range of power with which jitter does not exceed a threshold.

The approximated curve 106 differs depending on pulse width. Thus, letting a pulse width used as a reference condition be denoted as W4, recording is carried out at power values P1, P2, and P3 for each of the pulse widths W1 to W6 centered around W4, checking cross points between the threshold and approximated curves 106 thereby obtained. Thus, as represented in the matrix image shown in FIG. 11, a power range where jitter does not exceed the threshold is obtained for each of the pulse widths, and a hatched region shown in FIG. 11 is used as a test region. The three power conditions P1, P2, and P3 and the pulse width W4 used as reference condition correspond to 108-1, 108-2, and 108-3 in the matrix image shown in FIG. 11. The test region is set as a surface region defined by power×pulse width around the reference condition.

By obtaining a power range for each pulse width as described above, a region where jitter does not exceed the threshold can be tested in a concentrated manner, so that a suitable condition can be found by a smaller number of times of testing.

The number of times of testing can also be reduced by setting a larger step size of changing power value when the power margin is large and setting a smaller step size of changing power value when the power margin is small. For example, when the power margin is 10 mW, it is presumed that rough testing suffices to obtain an optimal value, so that testing is carried out five times with a step size of 2 mW, and when the power margin is 1 mW, it is presumed that more precise testing is needed, so that testing is carried out ten times with a step size of 0.1 mW.

Figure 12:
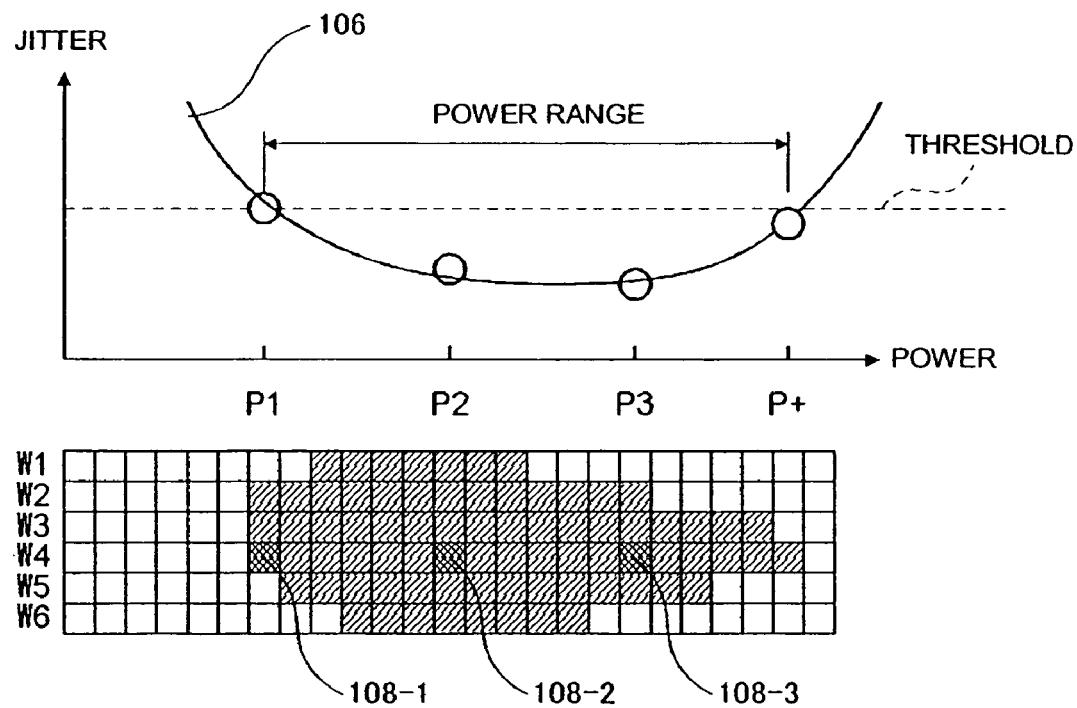
FIG. 12 is a schematic diagram showing an example of determining a test region in step S22 shown in FIG. 4 when a right-decreasing pattern is obtained in step S20.

FIG. 12 is a schematic diagram showing an example where a test region is determined in step S22 when a right-decreasing pattern is obtained in step S20 shown in FIG. 4. When a right-decreasing pattern is obtained, it is presumed that the optimal parameter exists on the side of high power, as shown in FIG. 12. Thus, additional recording is carried out at a power value P+ that is higher than P3, and a range defined by cross points between the threshold and an approximated curve 106 drawn by jitter values obtained for P1, P2, P3, and P+, respectively, is used as a power range. This processing is carried out for each of the pulse widths W1 to W6, obtaining a test region represented in the matrix image shown in FIG. 12.

The test region determined by the procedure described above is shifted to the side of high power compared with the surface region defined by power×pulse width and centered around the reference conditions 108-1, 108-2, and 108-3. Although W1 to W6 used for the valley pattern are used in this example, since a right-decreasing pattern indicates a lower sensitivity, W1 to W6 may be shifted to the side of wide pulse width in determining a power range.

FIG. 13 is a schematic diagram showing an example where a test region is determined in step S22 when a right-increasing pattern is obtained in step S20 shown in FIG. 4. When a right-increasing pattern is obtained, it is presumed that the optimal parameter exists on the side of low power, as shown in FIG. 13. Thus, additional recording is carried out at a power value P+ that is lower than P1, and a power range is defined by cross points between the threshold and an approximated curve 106 drawn by jitter values obtained for P+, P1, P2, and P3, respectively. This processing is carried out for each of the pulse widths W1 to W6, obtaining a test region represented in the matrix image shown in FIG. 13.

The test region determined by the procedure described above is shifted to the side of low power compared with the surface region defined by power×pulse width and centered around the reference conditions 108-1, 108-2, and 108-3. Although W1 to W6 used for the valley pattern are used in this example, since a right-increasing pattern indicates a high sensitivity, W1 to W6 may be shifted to the side of narrow pulse width in determining a power range.

That is, according to the method described above, recording characteristics are tested for each pulse width, and the number of times of testing is determined for each pulse width according to results of the testing. Thus, reduction in the number of times of testing is expected. The testing of recording characteristics, described above, is an example where change in jitter by recording at the reference condition is patterned. Preferably, the following eight patterns are used.

FIG. 14 is a diagram showing an example where eight patterns are used in step S20 shown in FIG. 4. As shown in FIG. 14, a pattern 1 applies when the maximum value of jitter is not larger than the threshold, regardless of whether the pattern is a valley, right increasing, or right decreasing. When this pattern is obtained, it is presumed that the sensitivity of the recording medium is substantially the same as the sensitivity of the reference medium and that a large margin where the jitter value does not exceed the threshold is provided, so that the power condition is extended on both low power side and high power side. That is, with the pattern 1, since values in the vicinity of the threshold are not obtained, additional recording is carried out both on the low power side and the high power side.

Then, jitter characteristics obtained by the additional recording are approximated by a curve, and the difference between larger and smaller two values at which the curve crosses the jitter threshold is used as a reference value of power range.

Furthermore, when this pattern is obtained, a pulse width region of the reference value ±0.2T is determined as a test region. In test recording, an optimal recording condition is determined by changing the pulse width by a step size of 0.2T. T denotes the length of a unit time of a recording pit.

Now, let the reference pulse width be a pulse condition 1, and the extended two points be pulse conditions 2 and 3, the pulse conditions 2 and 3 for the pattern 1 are pulse widths extended by ±0.2T. In accordance with the change in the pulse width condition, the power range used as a test condition is also changed.

More specifically, when the pulse width is changed by 0.1T, the power range for the pulse width is defined as the reference value of power range×(1−0.05×1) mW. When the pulse width is changed by 0.2T, the power range for the pulse width is defined as the reference value of power range×(1−0.05×2) mW. When the pulse width is changed by −0.1T, the power range for the pulse width is defined as the reference value of power range×(1−0.05×(−1)) mW.

Thus, the following three sets of test conditions are used for the pattern 1.

(1) Reference value of pulse width, and reference value of power range (2) Reference value of pulse width−0.2T, and reference value of power range×(1−0.05×(−2)) mW (3) Reference value of pulse width+0.2T, and reference value of power range×(1−0.05×(+2)) mW In this embodiment, the reference condition (1) need not be used in actual test recording.

A pattern 2 applies when a valley pattern is obtained and the minimum value of jitter is not larger than the threshold. When this pattern is obtained, it is determined that the sensitivity of the medium on which data is to be recorded and the sensitivity of the reference medium are substantially the same, so that reference value ±0.1T is selected as a pulse width condition. Then, a power range is set for each of these pulse conditions by the same procedure used for the pattern 1. Thus, test conditions that are used when the pattern 2 applies are the following three sets.

(1) Reference value of pulse width, and reference value of power range (2) Reference value of pulse width−0.1T, reference value of power range×(1−0.05×(−1)) mW (3) Reference value of pulse width+0.1T, reference value of power range×(1−0.05×(+1)) mW A pattern 3 applies when a valley pattern is obtained and the minimum value of jitter is larger than the threshold. When this pattern is obtained, it is determined that the sensitivity of the medium on which data is to be recorded is substantially the same as the sensitivity of the reference media, and that difference in the characteristics of medium is large, so that reference value ±0.2T is selected as a pulse width condition. Then, a power range is set for each of these pulse conditions by the same procedure used for the pattern 1. Thus, test conditions that are used when the pattern 3 applies are the following three sets.

(1) Reference value of pulse width, and reference value of power range (2) Reference value of pulse width−0.2T, and reference value of power range×(1−0.05×(−2)) mW (3) Reference value of pulse width+0.2T, and reference value of power range×(1−0.05×(+2)) mW A pattern 4 applies when a right-decreasing pattern is obtained and the minimum value of jitter is not larger than the threshold. When this pattern is obtained, it is determined that the sensitivity of the medium on which data is to be recorded is somewhat lower than the sensitivity of the reference medium, so that three points corresponding to the reference value, +0.1T, and +0.2T are selected as pulse width conditions. Then, a power range is set for each of these pulse conditions by the same procedure used for the pattern 1. Thus, test conditions that are used when the pattern 4 applies are the following three sets.

(1) Reference value of pulse width, and reference value of power range (2) Reference value of pulse width+0.1T, and reference value of power range×(1−0.05×(+1)) mW (3) Reference value of pulse width+0.2T, and reference value of power range×(1−0.05×(+2)) mW A pattern 5 applies when a right-decreasing pattern is obtained and the minimum value of jitter is larger than the threshold. When this pattern is obtained, it is determined that the sensitivity of the medium on which data is to be recorded is considerably lower than the sensitivity of the reference medium, so that three points corresponding to the reference value, +0.2T, and +0.4T are selected as pulse width conditions. Then, a power range is set for each of these pulse conditions by the same procedure used for the pattern 1. Thus, test conditions that are used when the pattern 5 applies are the following three sets.

(1) Reference value of pulse width, and reference value of power range (2) Reference value of pulse width+0.2T, and reference value of power range×(1−0.05×(+2)) mW (3) Reference value of pulse width+0.4T, and reference value of power range×(1−0.05×(+4)) mW A pattern 6 applies when a right-increasing pattern is obtained and the minimum value of jitter is not larger than the threshold. When this pattern is obtained, it is determined that the sensitivity of the medium on which data is to be recorded is somewhat higher than the sensitivity of the reference medium, so that three points corresponding to the reference value, −0.1T, and −0.2T are selected as pulse width conditions. Then, a power range is set for each of these pulse conditions by the same procedure use for the pattern 1. Thus, test conditions that are used when the pattern 6 applies are the following three sets.

(1) Reference value of pulse width, and reference value of power range (2) Reference value of pulse width−0.1T, and reference value of power range×(1−0.05×(−1)) mW (3) Reference value of pulse width−0.2T, and reference value of power range×(1−0.05×(−2)) mW A pattern 7 applies when a right-increasing pattern is obtained and the minimum value of jitter is larger than the threshold. When this pattern is obtained, it is determined that the sensitivity of the medium on which data is to be recorded is considerably higher than the sensitivity of the reference medium, so that three points corresponding to the reference value, −0.2T, and −0.4T are selected as pulse width conditions. Then, a power range is set for each of these pulse conditions by the same procedure used for the pattern 1. Thus, test conditions that are used when the pattern 7 applies are the following three sets.

(1) Reference value of pulse width, and reference value of power range (2) Reference value of pulse width−0.2T, and reference value of power range×(1−0.05×(−2)) mW (3) Reference value of pulse width−0.4T, and reference value of power range×(1−0.05×(−4)) mW A pattern 8 applies when a mountain pattern is obtained and the maximum value of jitter is larger than the threshold. When this pattern is obtained, it is determined that the pattern is abnormal, so that the reference value ±0.2T are selected as pulse width conditions. Then, a power range is set for each of these pulse width conditions by the same procedure used for the pattern 1. Thus, test conditions that are used when the pattern 8 applies are the following three sets.

(1) Reference value of pulse width, and reference value of power range (2) Reference value of pulse width−0.2T, and reference value of power range×(1−0.05×(−2)) mW (3) Reference value of pulse width+0.2T, and reference value of power range×(1−0.05×(+2)) mW Of the eight patterns described above, when patterns other than the pattern 2, which is most approximate to the characteristics of the reference medium, are detected, in order to confirm that the pattern detected is not due to an incorrect playback operation, the recording result that has caused the pattern may be played back again to detect jitter. In this case, when characteristics other than the pattern 2 are detected, recording conditions are added or extended according to the conditions shown in FIG. 14.

When the pattern 8 is detected by the confirmation of an incorrect playback operation, it is possible that an incorrect recording operation has occurred. Thus, recording is performed again at the reference value of pulse width before performing additional recording and extending pulse width. When the pattern 8 is again obtained by the recording, additional recording, i.e., extending power to measure a margin for the pulse condition 1, is not carried out, and pulse conditions 2 and 3 are extended. The power value is extended in accordance with the extension of the pulse conditions 2 and 3 by the method described earlier.

That is, in the case of the pattern 8, a margin is not provided with the pulse condition 1 and a power range that serves as a reference for extension is not obtained, so that an initial power condition range is set as a reference power range.

Determining Test Region: Determining Power Range by Approximation

By executing the procedure described above, a test region that is effective for obtaining an optimal solution by a small number of times of testing is determined. Now, a method of determining a power range, which is important in determining a test region, will be described.

In this embodiment, in order to improve the accuracy of finding an optimal solution by a minimum number of times of testing, test conditions are concentrated to a region where the jitter value does not exceed the threshold, as described earlier. According to this scheme, a power range that is used in test recording is calculated from power values at larger and smaller two points defining a margin with respect to the threshold. The margin with respect to the threshold refers to a region where characteristic values not exceeding the threshold are obtained. The power values at larger and smaller points refer to a value on the low power side and a value on the high power side defining the width of the margin.

Considering the reduction in test recording time of various media, and the efficiency of test region of a medium having restriction on a test recording region, such as a write-once medium, the number of recording points needed for test recording should preferably be minimized. However, since the power range to be obtained is an important parameter that serves as a criterion for determining an optimal recording condition, a high precision is desired.

A precise power range means concentrated testing of a selected region, so that the number of times of testing is reduced. For example, when test recording is performed at a frequency of once per 0.1 mW, test recording is performed ten times when the power range is 1 mW, and test recording is performed twenty times when the power range is 2 mW. Thus, narrowing the power range contributes to reduction in the number of times of testing.

Thus, in this embodiment, considering that the recording quality of recording and playback signals changes like a quadratic curve with a pole at an optimal point with respect to recording power, a characteristic curve is approximated using several recording points to determine an amount of margin. By using such an approximation method, it is possible to readily and precisely determine a power range based on several recording points, serving to reduce the number of times of testing.

Figure 15:
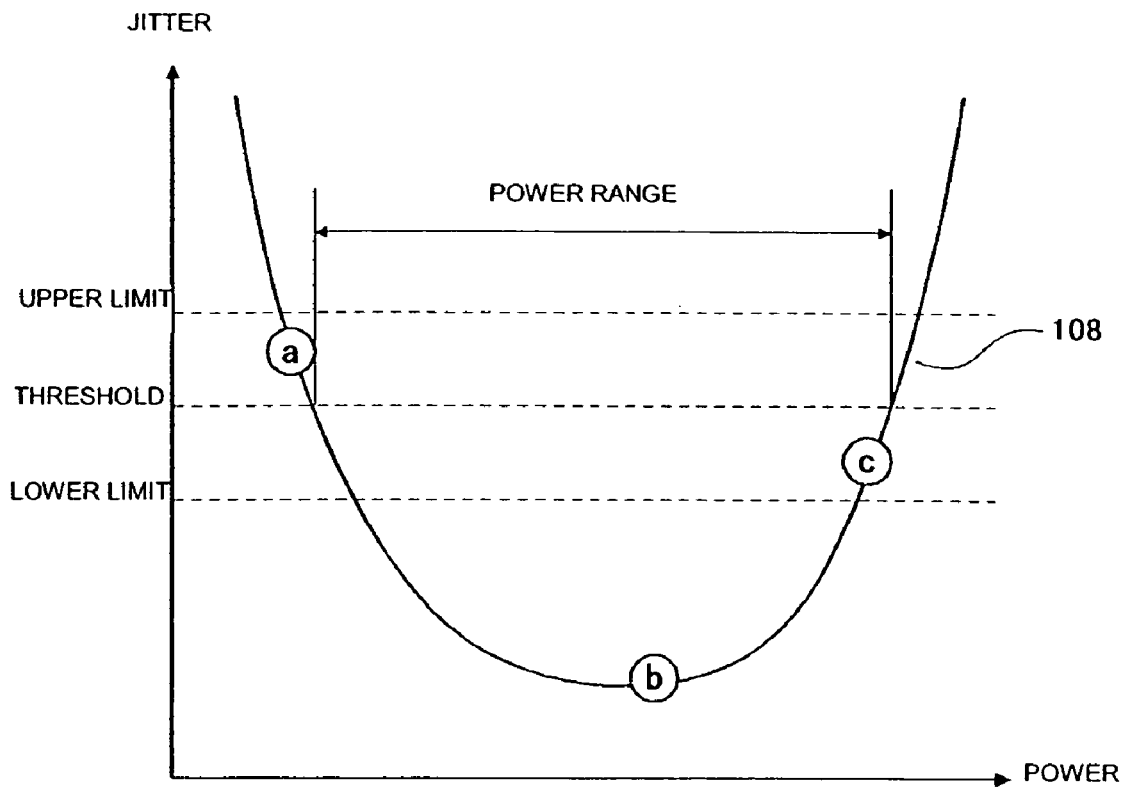
FIG. 15 is a schematic diagram showing an example method of obtaining a power range used in step S22 shown in FIG. 4 by curve approximation.

FIG. 15 is a schematic diagram for explaining a method of obtaining a power range used in step S22 shown in FIG. 4 by curve approximation. As shown in FIG. 15, to carry out approximation, first, two points a and c on the low power side and the high power side, respectively, at which the jitter value that serves as a criterion for determining recording characteristics is in the vicinity of the threshold, and a point b between the points a and c, at which the jitter value is smaller than the threshold or the values at the points a and c, are selected. That is, the points a, b, and c have the following relationship.

a>b, c>b, threshold>b

As shown in FIG. 15, the vicinity of the threshold is defined as a range between an upper limit and a lower limit having a certain width with respect to the threshold. Preferably, the upper limit is set to be 40% of the threshold, and the lower limit is set to be 5% of the threshold. Then, the values of a, b, and c are approximated by a quadratic function, and a power range is defined by the difference between larger and smaller two points where the quadratic curve crosses the threshold. The range that is defined as the vicinity of the threshold may be changed suitably in consideration of the interval of recording points, for example, to −5% to +40% or −10% to 30%.

Figure 16:
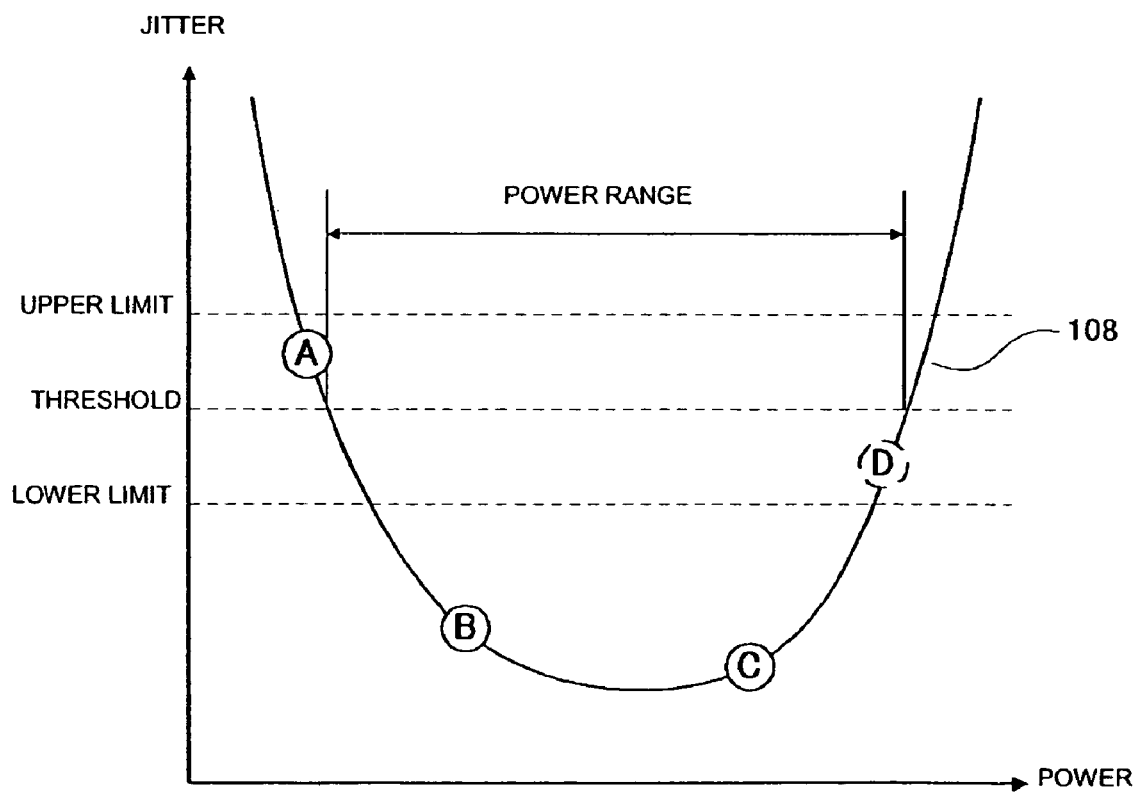
FIG. 16 is a schematic diagram showing another example method of obtaining a power range used in step S22 shown in FIG. 4 by curve approximation.

FIG. 16 is a schematic diagram showing another example where a power range used in step S22 shown in FIG. 4 is obtained by a curve approximation. As shown in FIG. 16, when a relationship satisfying a>b, c>b, and threshold>b is not obtained with the three conditions A, B, and C alone, preferably, a condition D on the high power side is added to obtain a value in the vicinity of the threshold.

Furthermore, as shown in FIG. 16, when a relationship of B>C exists, preferably, an approximate equation is calculated with three points A, C, and D without using B.

The relationship between the three recording points and the threshold in this case is A>C, D>C, and threshold>C, which is suitable for drawing an approximated curve, so that a precise approximated curve is obtained by three-point approximation. The additional recording condition indicated at D is determined by A>B, B>C, and the threshold indicated by recording points before addition.

On the contrary to FIG. 15, when a value in the vicinity of the threshold is absent on the low power side, additional recording is performed at a power condition lower than A. Depending on the relationship between the recording points and the threshold, one or more recording conditions may be added.

Furthermore, the range of power used as additional recording conditions may be changed based on a predetermined power step size, or power conditions may be set based on relationship between power variation and jitter variation obtained in advance.

When recording points sufficient to obtain a power range are not obtained even after adding recording conditions as described above, recording points are changed by again adding recording conditions by the same procedure described above.

Furthermore, in a case where test recording region is restricted, such as in the case of a write-once medium, in order to avoid using an enormous testing time, an upper limit may be set to the number of times recording conditions are added. Furthermore, an upper limit of power for additional recording may be set so that recording power will not exceed a laser output value by adding recording conditions.

Furthermore, although a power range is determined by three-point approximation in the example described above, alternatively, a power range may be determined by based on the difference between power values at larger and smaller two points that are most approximate to the threshold.

Alternatively, two points in the vicinity of the threshold may be selected by performing recording while changing power until larger and smaller two points across the threshold are found, and two points that are most approximate to the threshold may be selected, or the two points themselves may be selected. The methods will be described in more detail.

Determining Test Region: Determining Power Range by Sampling

FIG. 17 is a schematic diagram showing an example where a power range used in step S22 shown in FIG. 4 is determined by sampling. In the example shown in FIG. 17, instead of the three-point approximation described earlier, power is gradually changed until values approximate to the threshold is obtained, a power range is determined based on power values at larger and smaller two points in the vicinity of the threshold.

More specifically, as shown in FIG. 17, recording power is increased sequentially as P1, P2, P3, . . . to carry out recording and playback until a power value P6 at which a value not smaller than the threshold is obtained. As shown in a matrix image in FIG. 17, power is changed over P1 to P6, and a power range is defined between P2 on the low power side and P6 on the high power side that are most approximate to the threshold. As described above, a power range can be determined by selecting two points across the threshold.

A method for selecting large and smaller points in the vicinity of the threshold can be selected as appropriate from the following.

1) Select larger and smaller two points defining a power margin. That is, select two points that are most approximate to a playback reference value within a power range satisfying the playback reference value.

2) Select two points that are most approximate to a playback reference value although somewhat outside of a power margin.

3) Select larger and smaller two points across a playback reference value on the low power side.

4) Select larger and smaller two points across a playback reference value on the high power side.

5) Select two points that are most approximate to a playback reference value and that are located across the playback reference value on the low power side and the high power side.

It is also possible to approximate recording characteristics using two points selected by one of the above methods, determining two points at which the recording characteristics cross the playback reference value.

Test Recording

FIGS. 18A and 18B are schematic diagrams showing examples of pulse pattern used in test recording in step S24 shown in FIG. 4. FIG. 18A shows an example where a single-pulse pattern is used. FIG. 18B shows an example where a multiple-pulse pattern is used. As shown in FIGS. 18A and 18B, a single-pulse pattern 10-1 and a multiple-pulse pattern 10-2 each include a leading pulse 12 at the beginning of the pattern and a trailing pulse 14 at the end of the pattern. The amount of energy of the entire recording pulse is defined by the height of main power PW, and the amount of energy at the first stage applied to an edge of a recording pit is defined by the length of the leading pulse width Ttop. PWD indicated by a dotted line is a region used for delicate control of the amount of energy, which will be described later.

Preferably, the main power PW has a highest value in the recording pulse 10-1 and 10-2. The leading pulse width Ttop has a width corresponding to a recording pit having a length of 3T. Since recording pulses having this width have the highest frequency of occurrence and has much effect on recording quality, preferably, the leading pulse width Ttop is changed in test recording.

As shown in FIGS. 18A and 18B, in either case where the single-pulse pattern or the multiple-pulse pattern is used, the value of test power determined by the preceding steps is used as the main power PW, and the width of the test pulse is used as the leading pulse width Ttop.

As described above, test recording is carried out on the medium loaded in step S16 shown in FIG. 4 while changing the main power PW and the leading pulse width Ttop in a stepwise manner, and playback is carried out based on recording pits formed by the test recording, thereby obtaining a jitter value for each test condition.

Then, test recording is carried out once more using a predetermined pattern of pits and lands to examine other adjustment factors such as mismatch between recording pulses and recording pits. Then, the series of test recording operations is finished.

Determining Recording Condition

Through the test recording described above, values of the main power PW and the leading pulse width Ttop with which the jitter value is minimized, and parameters for adjusting other factors are determined, and these values are used as a recording condition suitable or the combination of the drive and the medium used.

Figure 19A:
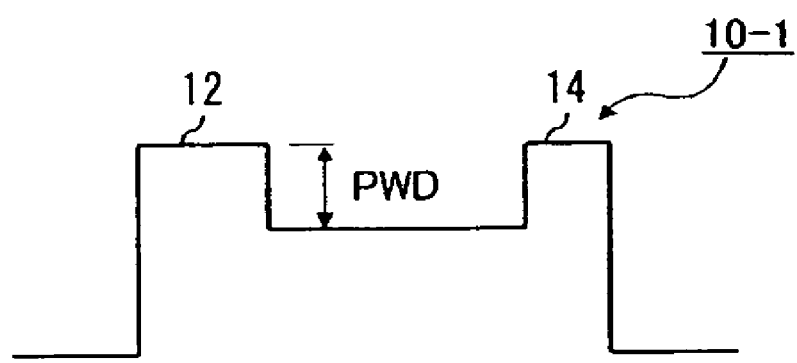
FIGS. 19A and 19B are schematic diagrams showing examples of other factors to be adjusted, determined in step S26 shown in FIG. 4.
Figure 19B:
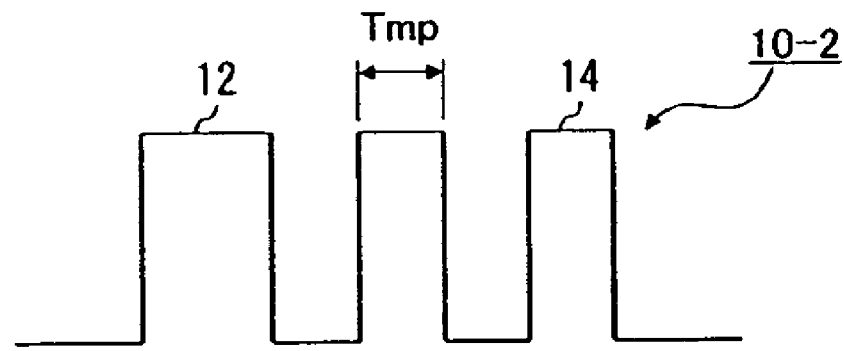

FIGS. 19A and 19B are schematic diagrams showing examples of adjustment of other factors determined in step S26 shown in FIG. 4. FIG. 19A shows an example where a single-pulse pattern is used. FIG. 19B shows an example where a multiple-pulse pattern is used.

As shown in FIG. 19A, in the case of the single-pulse pattern 10-1, a region of low power that is lower than the main power PW by PWD is provided between the leading pulse 12 and the trailing pulse 14 as another factor to be adjusted. By defining this amount, recording pits are prevented from forming a teardrop shape. Similarly, in the case of the multiple-pulse pattern 10-2, as shown in FIG. 19B, by defining the width Tmp of an intermediate pulse between the leading pulse 12 and the trailing pulse 14, recording pits are prevented from forming a teardrop shape.

Figure 20A:
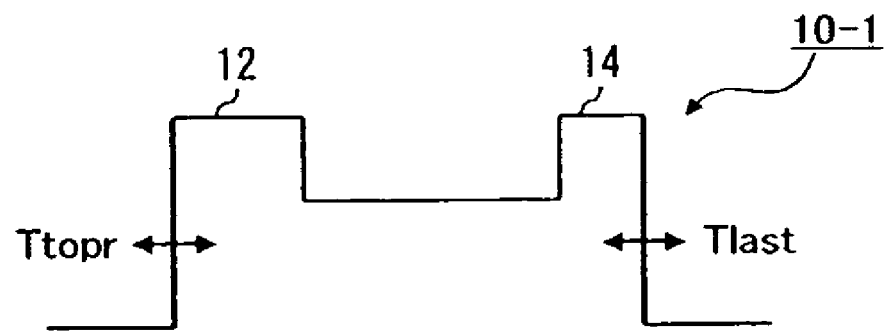
FIGS. 20A and 20B are schematic diagrams showing examples of other factors to be adjusted, determined in step S26 shown in FIG. 4.
Figure 20B:
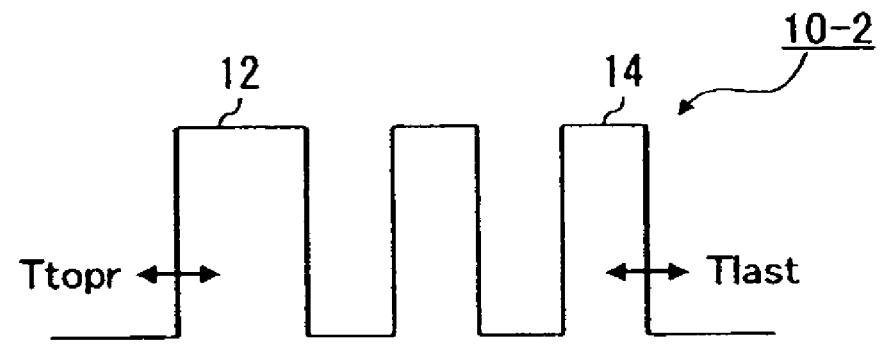

FIGS. 20A and 20B are schematic diagrams showing examples of other factors to be adjusted, determined in step S26 shown in FIG. 4. Similarly to FIGS. 18A and 18B, FIG. 20A shows an example where a single-pulse pattern is used, and FIG. 20B shows an example where a multiple-pulse pattern is used.

As shown in FIGS. 20A and 20B, in either case where the single-pulse pattern 10-1 or the multiple-pulse pattern 10-2 is used, Ttopr for adjusting the starting position of the leading pulse 12, and Tlast for adjusting the ending position of the trailing pulse 14 are set as other factors to be adjusted. By adjusting these values, a pulse pattern with which a pit length after recording has an appropriate value is selected.

The main power PW, the leading pulse width Ttop, the low power region PWD, the leading pulse position Ttopr, and the trailing pulse position Tlast, obtained by the procedure described above, are stored in the memory 38 shown in FIG. 3. Then, the determination of recording condition is completed.

Recording of Information

The LD controller 36 shown in FIG. 3 generates recording pulses for information to be recorded, input to the drive 20 from the outside, based on various recording conditions stored in the memory 38 by the procedure described above, and outputs the recording pulses to the pickup 30. Thus, the information is recorded on the medium 16.

Another Embodiment of Determining Test Region

Next, another embodiment of determining a test region, which constitutes a feature of the present invention, will be described.

Figure 21:
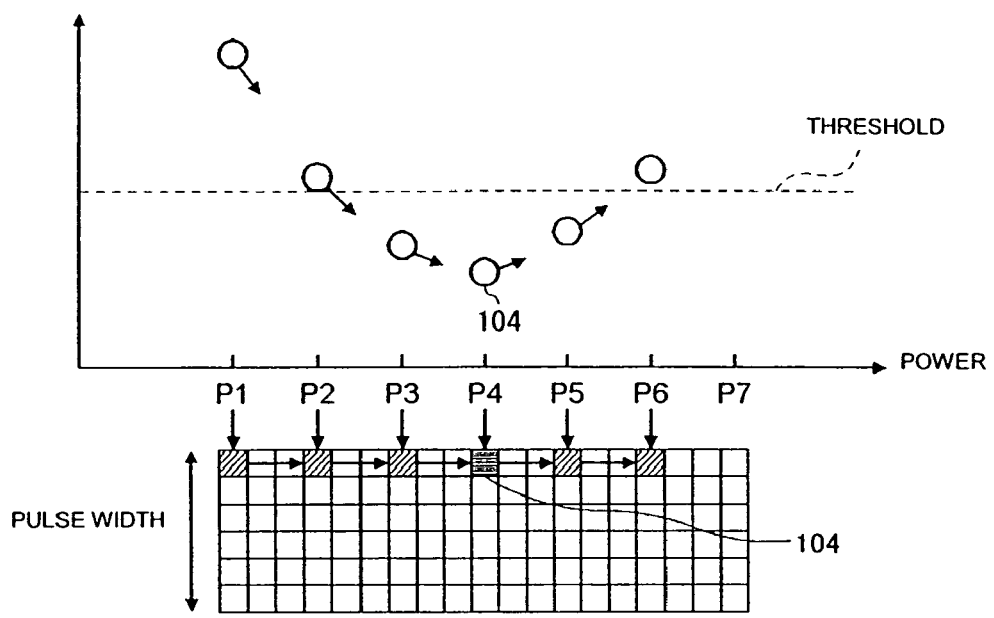
FIG. 21 is a schematic diagram showing an example where a test region extends up to a point where the threshold is exceeded.

FIG. 21 is a schematic diagram showing an example where the test region extends up to a point where the jitter value exceeds the threshold. In the example shown in FIG. 21, the power used in test recording is changed as P1, P2, ... to P6 at which the jitter value exceeds the threshold. As represented in an image matrix, the power is discretely changed from P1, P2, ... to P6 for a pulse width, and the power value P4 with which the jitter value is minimized is used as a recording condition 104. In this case, the power range is defined by P1 to P6 over which the power is changed, and a range of P2 to P6 that is close to the region where the threshold is not exceeded serves as a power margin. As described above, the test region extends up to a point where the threshold is reached, so that the number of times of testing is reduced compared with a case where testing is carried out over a constant power range.

Figure 22:
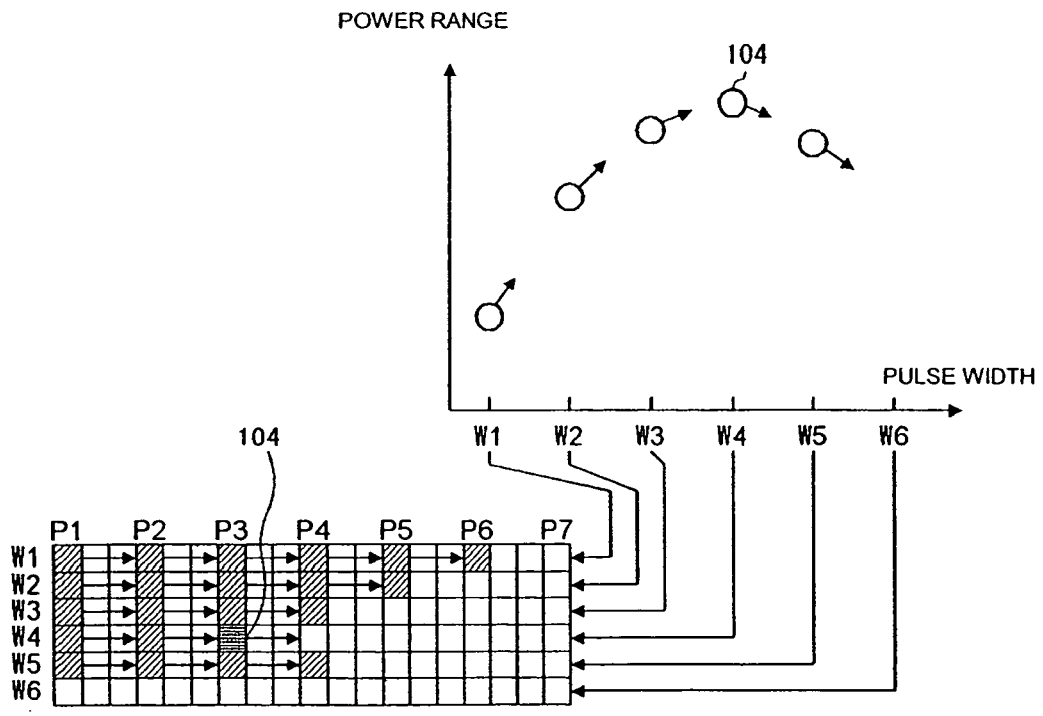
FIG. 22 is a schematic diagram showing an example where a test region extends up to a point where a pole of power range is obtained in addition to the procedure of the example shown in FIG. 21.

FIG. 22 is a schematic diagram showing an example where a test region extends up to a point where a pole of power range is obtained. In the example shown in FIG. 22, in addition to the procedure of the example shown in FIG. 21, pulse width is changed, and the poles of power range or power margin obtained for the respective pulse widths are used as recording conditions. In this example, while sequentially changing pulse width as W1, W2, ..., power is changed for each of the pulse widths up to a point where the threshold is reached as shown in FIG. 21, and this step is repeated until a pulse width W4 with which power range or power margin is maximized is identified.

The pole of power range or power margin can be identified by examining the amount of change between values of adjacent sample points. Thus, when the pulse width W4 is a pole, test recording is carried out up to W5, which is immediately subsequent to W4. The power range and power margin differ among the pulse widths, so that the hatched region that are tested differs depending on the pulse width.

When the pulse width W4 is a pole, the pulse width W4 and a power P3 with which the jitter value is minimized for the pulse width W4 are used as a recording condition 104. As described above, by changing the pulse width in addition to the procedure of the example shown in FIG. 21, the test region can be extended in the direction of pulse width by a small number of times of testing.

Figure 23:
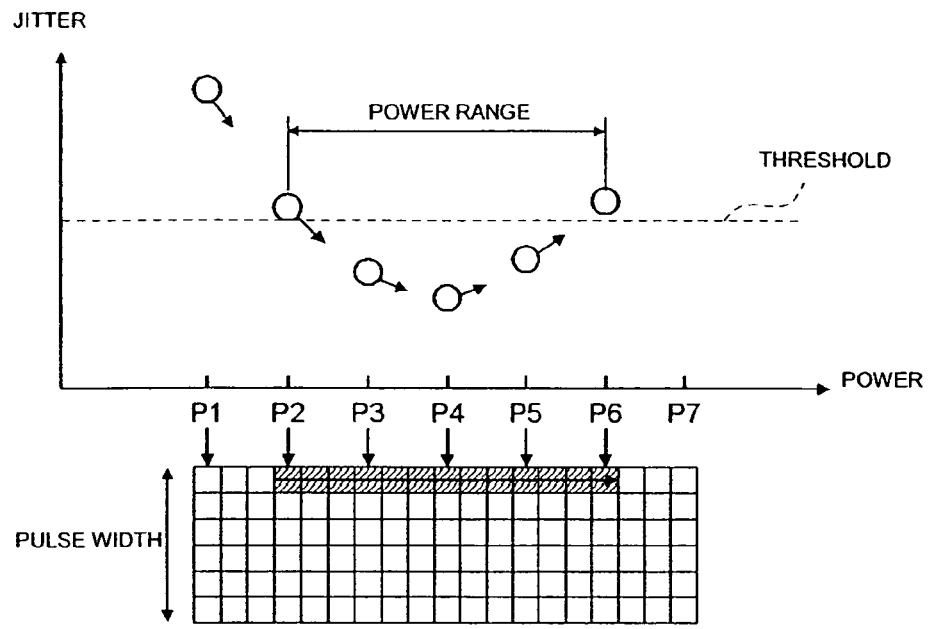
FIG. 23 is a schematic diagram showing an example where a range between two points in the vicinity of the threshold is used as a power range.

FIG. 23 is a schematic diagram showing an example where a power range is defined by two points in the vicinity of the threshold. In the example shown in FIG. 23, the power value is gradually changed until a value in the vicinity of the threshold is obtained, and a power range is determined based on larger and smaller power values at two points in the vicinity of the threshold. The procedure for this example is the same as that in the example shown in FIG. 17, so that a description thereof will be omitted.

This example differs from the example shown in FIG. 21 in that instead of testing sampling points between P2 and P6 alone, after determining a power range, the power is changed by a smaller step size over the range to determine a more suitable condition.

Figure 24:
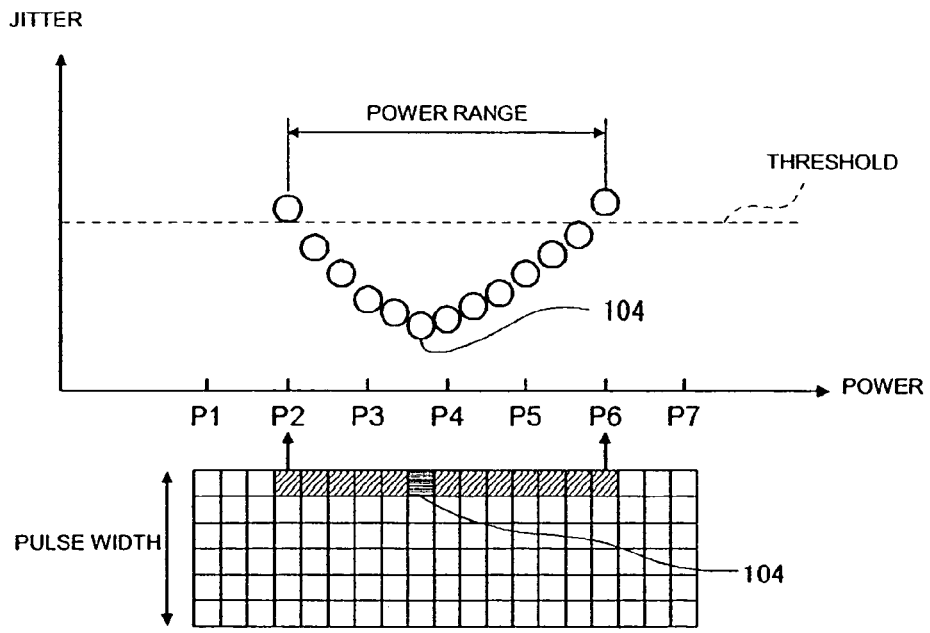
FIG. 24 is a schematic diagram showing an example where power value is changed by a smaller step size over the power range.

FIG. 24 is a schematic diagram showing an example where the power value is changed by a smaller step size over the power range. As shown in FIG. 24, the power value is changed by a smaller step size over the power range P2 to P6, and a power value with which the jitter value is minimized is used as a recording condition 104. As described above, by examining the power range by a smaller step size, a value approximate to an optimal value is obtained. In this example, an optimal point is found between P3 and P4.

Figure 25:
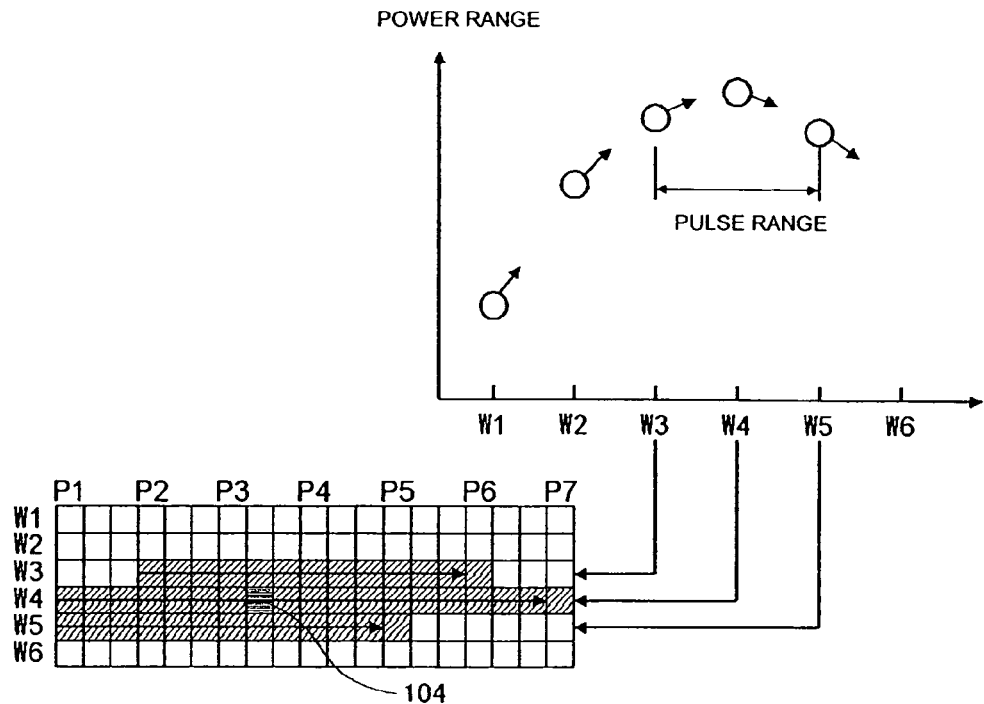
FIG. 25 is a schematic diagram showing an example where a test region extends up to a point where a pole of power range is obtained in addition to the procedure of the example shown in FIG. 24.

FIG. 25 is a schematic diagram showing an example where a test region extends up to a point where a pole of power range is obtained in addition to the procedure of the example shown in FIG. 24. In the example shown in FIG. 25, the pulse width is changed in addition to the procedure of the example shown in FIG. 24, and a pole of power range or power margin obtained for each pulse width is used as a recording condition. This scheme is the same as the scheme of applying the procedure of the example shown in FIG. 21 to the example shown in FIG. 22, so that a description thereof will be omitted.

Figure 26:
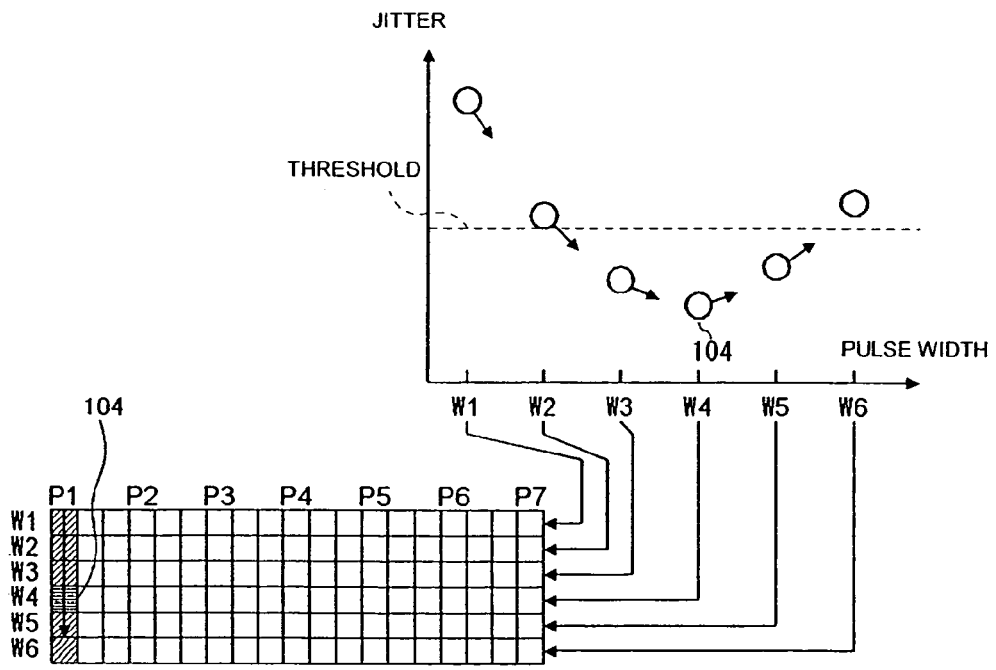
FIG. 26 is a schematic diagram showing an example where pulse width is changed up to a point where the threshold is exceeded and the range of change is used as a test region.

FIG. 26 is a schematic diagram showing an example where the pulse width is changed up to a point where the jitter value exceeds the threshold, and the range of changing the pulse width is used as a test region. In the example shown in FIG. 26, the pulse width used for test recording is sequentially changed as W1, W2, . . . , and the test recording is finished at W6 at which the jitter value exceeds the threshold. As represented by an image matrix, the pulse width is sequentially changed as W1, W2, . . . W6 for the power P1, and the pulse width W4 with which the jitter value is minimized among W1 to W6 is used as a recording condition 104. In this case, the pulse range to be tested is W1 to W6 over which the pulse width is changed, and the pulse margin is W2 to W6 that is close to a region where the jitter value does not exceed the threshold. As described above, by using a test region extending up to a point where the jitter value reaches the threshold, the number of times of testing is reduced compared with a case where a fixed pulse range is always used for testing.

Figure 27:
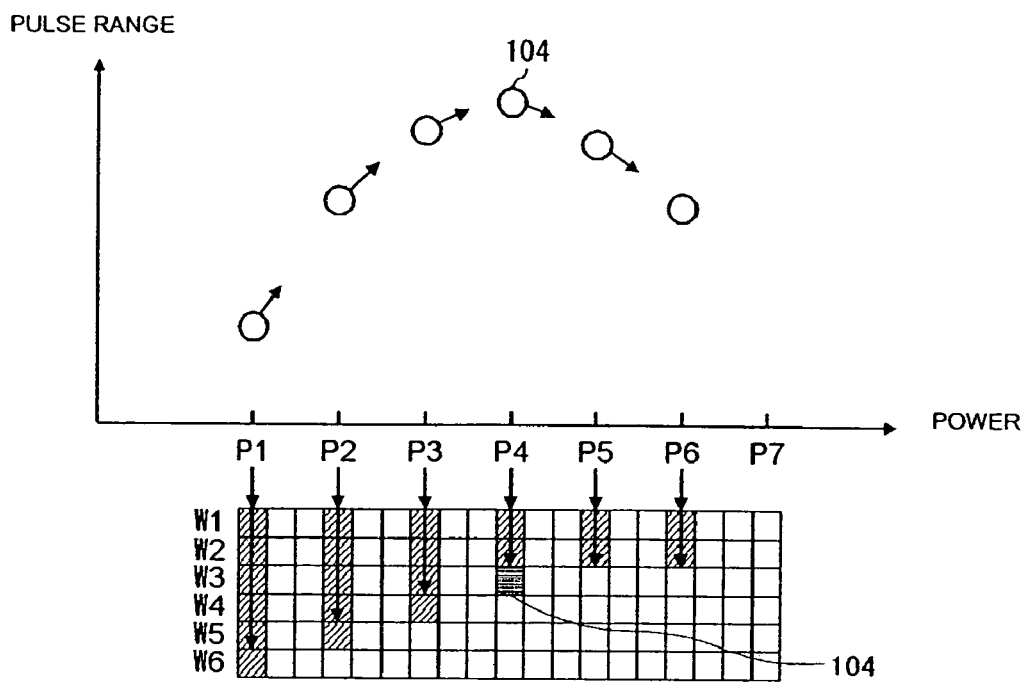
FIG. 27 is a schematic diagram showing an example where a test region extends up to a point where a pole of pulse range is obtained in addition to the procedure of the example shown in FIG. 26.

FIG. 27 is a schematic diagram where the test region extends up to a point where a pole of pulse range is obtained.

In the example shown in FIG. 27, in addition to the procedure of the example shown in FIG. 26, the power value is changed and a pole of pulse range or pulse margin determined for each power value is used as a recording condition. In this example, while sequentially changing the power value as P1, P2, . . . , the pulse width is changed for each power value until the jitter value reaches the threshold shown in FIG. 26, and this step is repeated until power P4 with which the pulse range or pulse margin is maximized is identified.

The pole of pulse range or pulse margin can be identified by examining the amount of change between values at adjacent sample points. Thus, when the power P4 is a pole, test recording is carried out up to P5, which is immediately subsequent to the power P4. Since the pulse range and pulse margin differ depending on the power value, the hatched region to be tested differs depending on the power value, as represented in the matrix image shown in FIG. 27.

When the power P4 is a pole, the power P4 and the pulse width W3 with which the jitter value is minimized for the power P4 are used as a recording condition 104. As described above, by changing the power value in addition to the procedure of the example shown in FIG. 26, the test region can be extended in the direction of power by a small number of times of testing.

Figure 28:
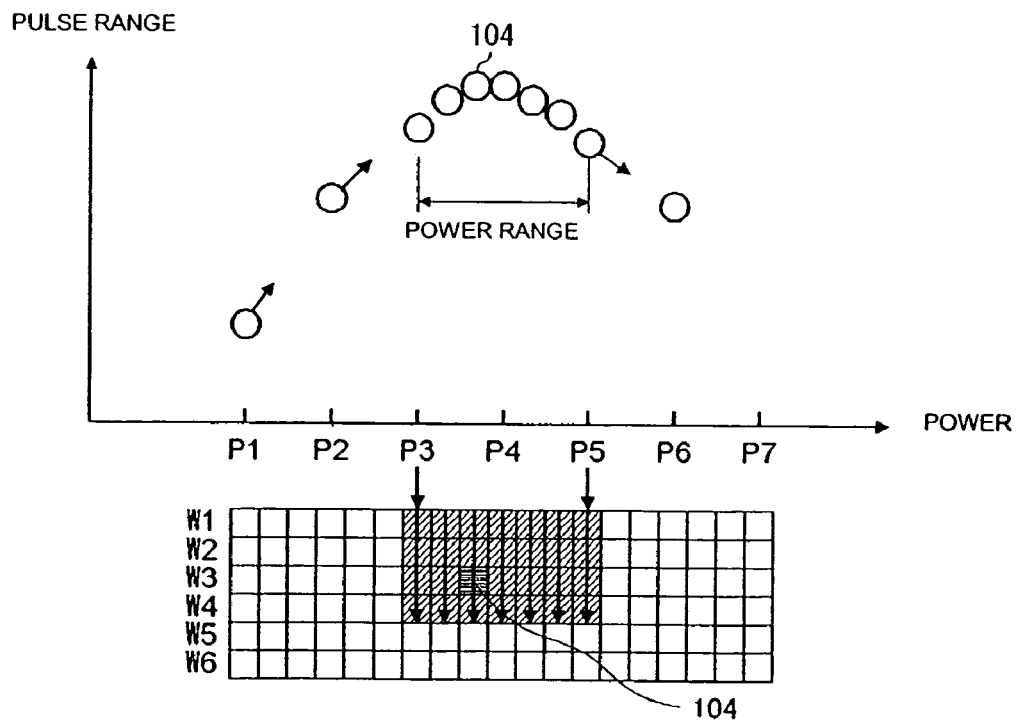
FIG. 28 is a schematic diagram showing an example where pulse width is changed by a smaller step size over the pulse range.

FIG. 28 is a schematic diagram showing an example where the power value is changed over the pulse range by a smaller step size. As shown in FIG. 28, the power value is changed by a smaller step size over P3 to P5 in the vicinity of the pole of the pulse range identified in FIG. 27, and a condition with which the jitter value is minimized is used as a recording condition 104. As described above, by changing the power value in the vicinity of the pole by a smaller step size, a value approximate to an optimal value can be found. In this example, an optimal point is found between P3 and P4.

Figure 29:
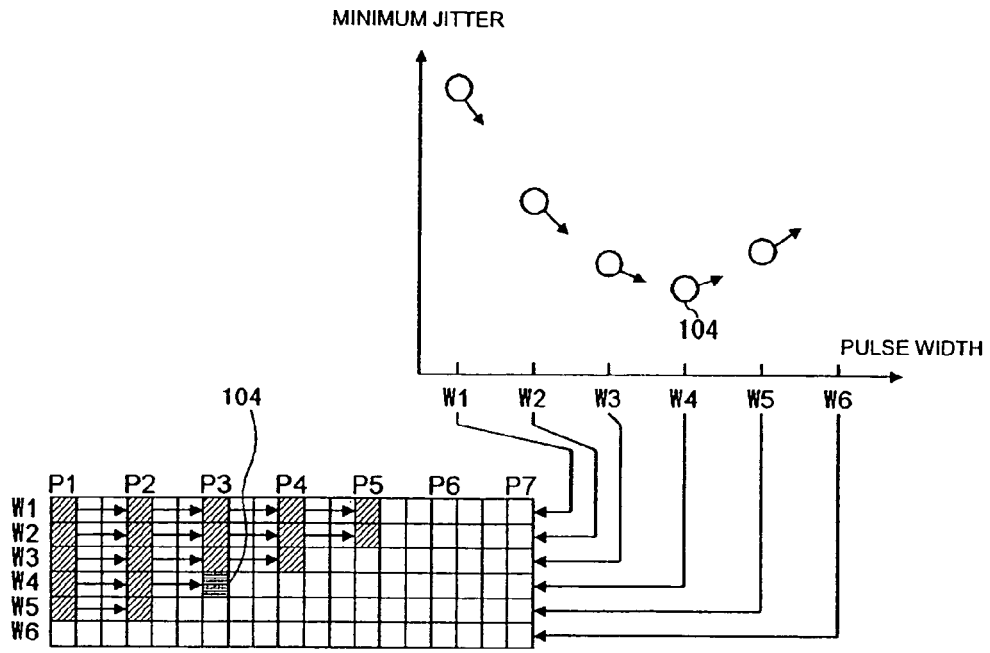
FIG. 29 is a schematic diagram showing an example where a test region extends up to a point where a pole of minimum jitter is obtained in addition to the procedure of the example shown in FIG. 21.

FIG. 29 is a schematic diagram showing an example where the test region extends up to a point where the pole of minimum jitter is obtained, in addition to the procedure of the example shown in FIG. 21. In the example shown in FIG. 29, in addition to the procedure of the example shown in FIG. 21, the pulse width is changed and the pole of minimum jitter determined for each pulse width is used as a recording condition. In this example, the pulse width is sequentially changed as W1, W2, . . . , and the procedure shown in FIG. 21 is executed for each of the pulse widths. While comparing the minimum jitter values thereby obtained, this step is repeated until a pulse width W4 with which the jitter value is minimized is identified.

The pole of minimum jitter value can be identified by examining the amount of change between values at adjacent sample points. Thus, when the pulse width W4 is a pole, test recording is carried out up to W5, which is immediately subsequent to W4. Since the minimum jitter value differs depending on the pulse width, the hatched region that is tested differs depending on the pulse width, as represented in the matrix image shown in FIG. 29.

When the pulse width W4 is a pole, the pulse width W4 and a power P3 with which the jitter value is minimized for the pulse width W4 are used as a recording condition 104. As described above, by detecting a pole of the minimum jitter value in addition to the procedure of the example shown in FIG. 21, the test region can be extended in the direction of pulse width by a small number of times of testing.

Figure 30:
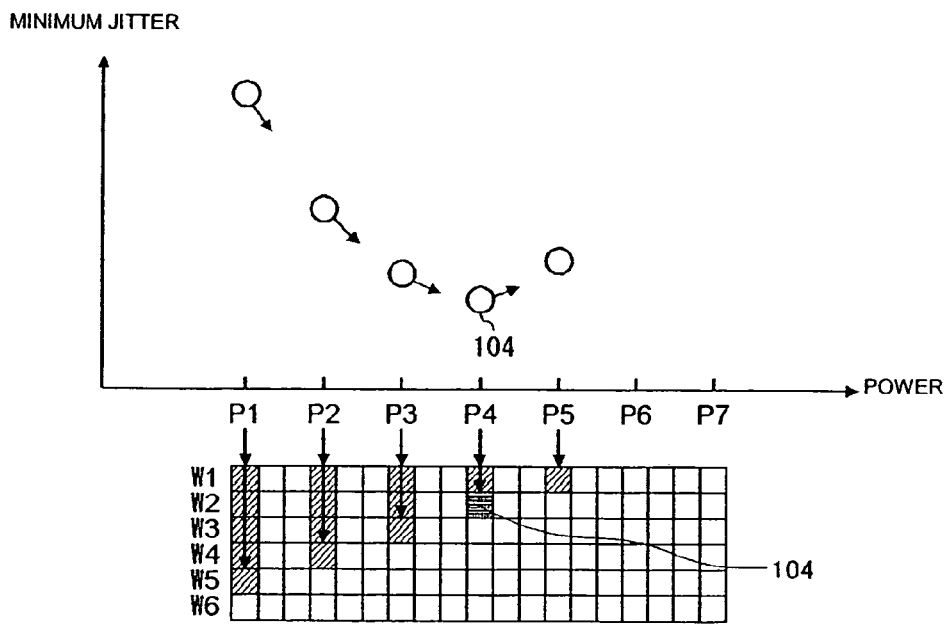
FIG. 30 is a schematic diagram showing an example where a test region extends up to a point where a pole of minimum jitter is obtained in addition to the procedure of the example shown in FIG. 26.
Figure 31:
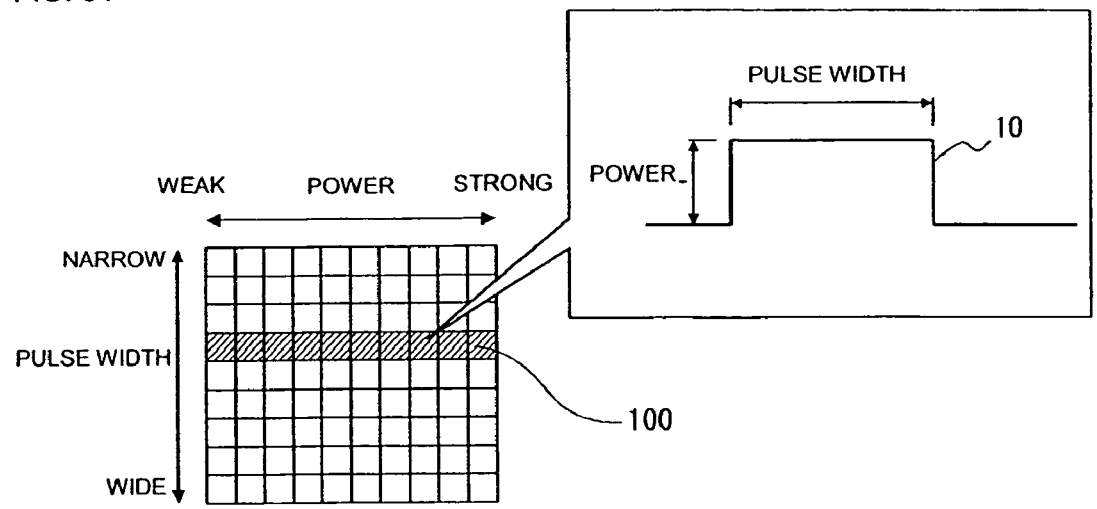
FIG. 31 a schematic diagram showing a method for determining a test condition based on ID information stored on a medium.
Figure 32:
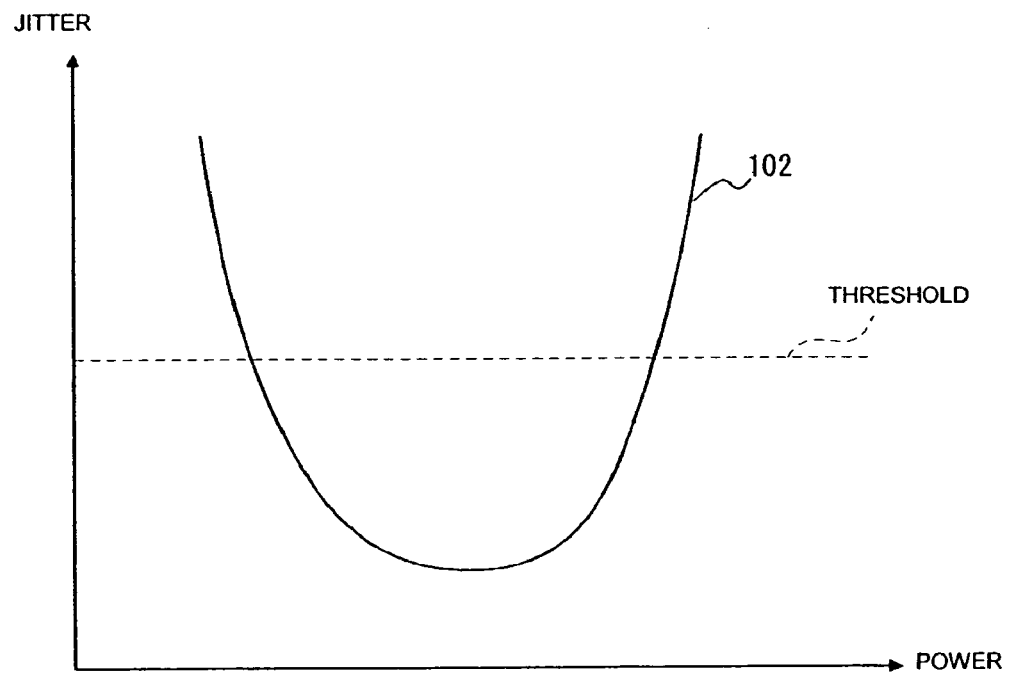
FIG. 32 is a schematic diagram showing playback characteristics obtained by a method according to a related art, shown in FIG. 31.
Figure 33:
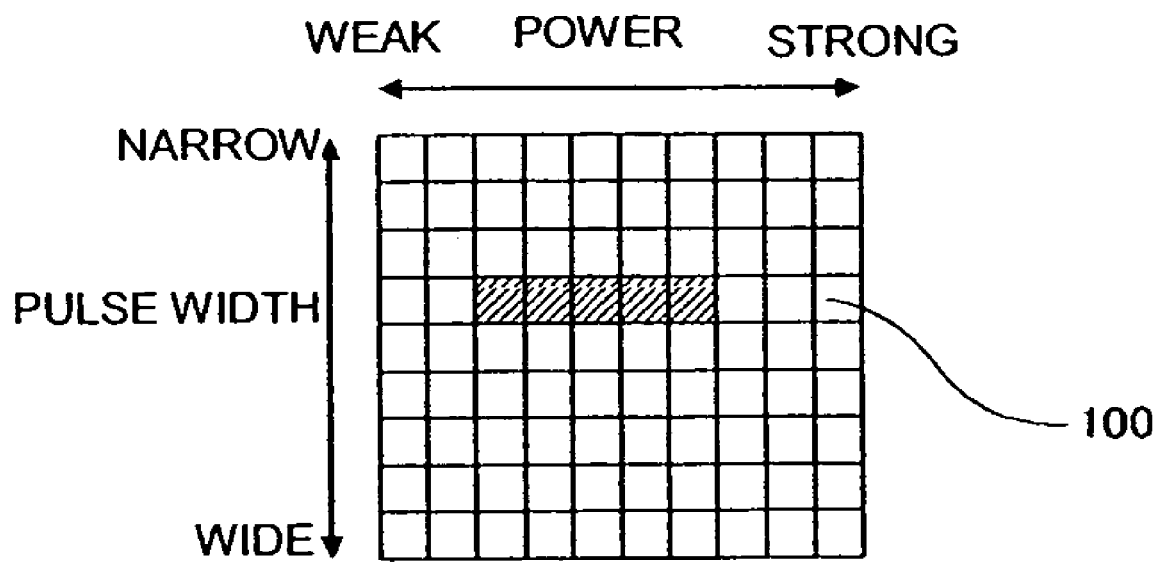
FIG. 33 is a schematic diagram showing features of a method according to a related art.
Figure 34:
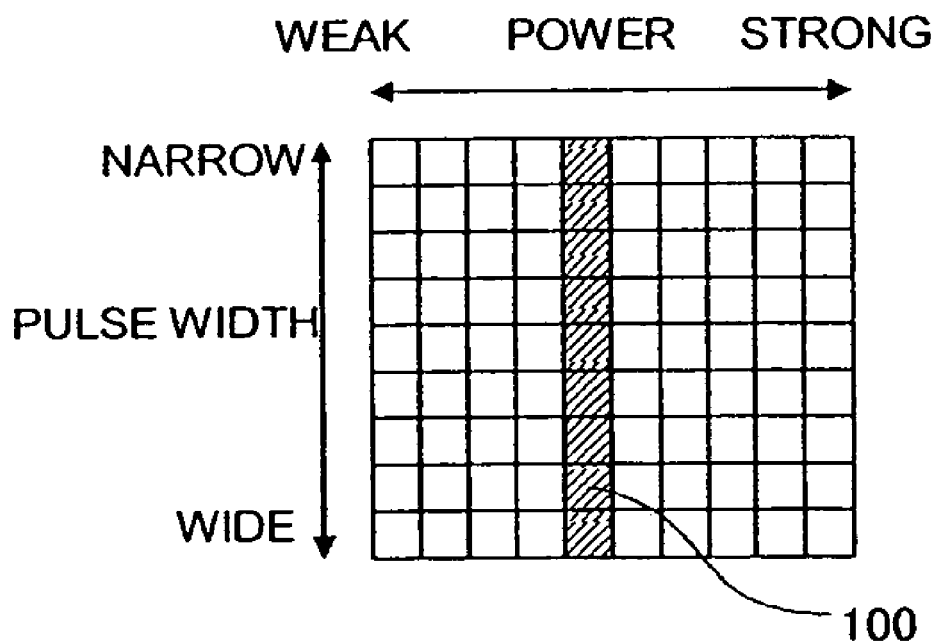
FIG. 34 is a schematic diagram showing features of methods according to related arts.

FIG. 30 is a schematic diagram showing an example where the test region extends up to a point where a pole of minimum jitter value is obtained, in addition to the procedure of the example shown in FIG. 26. In the example shown in FIG. 30, in addition to the procedure of the example shown in FIG. 26, power is changed and a pole of minimum jitter value determined for each power value is used as a recording condition. In this example, the power value is sequentially changed as P1, P2, . . . , and the procedure of the example shown in FIG. 26 is executed for each of the power values. While comparing the minimum jitter values thereby obtained, this step is repeated until a power P4 with which the jitter value is minimized is identified.

The pole of minimum jitter value can be identified by examining the amount of change between values at adjacent sample points. Thus, when the power P4 is a pole, test recording is carried out up to W5, which is immediately subsequent to W4. Since the minimum jitter value differs depending on the power value, the hatched region that is tested differs depending on the power value, as represented in the matrix image shown in FIG. 30.

When the power value P4 is a pole, the power value P4 and a pulse width W2 with which the jitter value is minimized for the power value P4 are used as a recording condition 104. As described above, by detecting a pole of the minimum jitter value in addition to the procedure of the example shown in FIG. 26, the test region can be extended in the direction of pulse width by a small number of times of testing.

As described above, according to this embodiment, a power value and/or a pulse range used in test recording are determined based on testing of recording characteristics, so that a more suitable recording condition can be determined by a smaller number of times of testing.

Preferably, recording characteristics are tested under a recording environment that is similar to an actual recording environment in view of medium characteristics, drive characteristics, and matching therebetween, determining a test condition based on the result of testing.

Instead of changing the number of times of testing, the test region may be shifted in accordance with the result of testing of recording characteristics. For example, the following schemes may be employed when recording characteristics are predicted to have the same sensitivity, lower sensitivity, and higher sensitivity, respectively.

(1) When the Sensitivity of the Recording Medium is Substantially the Same as the Sensitivity of the Reference Medium It is determined that the reference recording condition used for the prediction is close to an optimal condition. Thus, the power value and pulse width are extended by predetermined amounts with respect to the reference recording condition, and the resulting region is used as a test region. For example, when the reference recording condition is a power P and a pulse width W, the test region for the power value is P±5 mW, and the test region for the pulse width is W±0.2T.

(2) When the Sensitivity of the Recording Medium is Lower than the Sensitivity of the Reference Medium It is determined that an optimal value for the recording medium requires more heat than an optimal value for the reference medium. Thus, the test region is shifted to the side of high power and wide pulse width. For example, when the reference recording condition is a power P and a pulse width W, the test region for the power value is P to P+10 mW, and the test region for the pulse width is W to W+0.4T.

(3) When the Sensitivity of the Recording Medium is Higher than the Sensitivity of the Reference Medium It is determined that an optimal value for the recording medium requires less heat than an optimal value for the reference medium. Thus, the test region is shifted to the side of low power and narrow pulse width. For example, when the reference recording condition is a power P and a pulse width W, the test region for the power value is P−10 mW to P, and the test region for the pulse width is W−0.4T to W.

That is, in the example described above, with respect to the power P and the pulse width W, a region defined by a power range of 10 mW and a pulse range of 0.4 is shifted in accordance with recording characteristics so that a more suitable recording condition will be obtained. The test region may be determined based on the eight patterns shown in FIG. 14 and described earlier.

Alternatively, the number of times of testing may be changed instead of changing the test range.

According to the embodiment, it is possible to find, by a smaller number of times of testing, a recording condition suitable for a combination of medium and drive that are actually used. Thus, application to high-speed recording or high-density recording, which is considerably affected by the effect of variation in characteristics of media or drives, is expected.

What is claimed is:

1. A recording method for recording information onto an optical recording medium with a recording condition determined based on a result of test recording carried out by irradiating pulsed laser beams onto the medium wherein the test recording is carried out by changing one or both of the power and pulse width of the laser beams in a stepwise manner, and a range of changing the power, pulse width, or both is determined based on a result of checking recording characteristics prior to the test recording, wherein the recording characteristics are checked by carrying out test recording on the optical recording medium by a plurality of predetermined reference conditions and detecting a result of reproduced characteristics, wherein the range of changing the power is determined based on a difference between a larger power value and a smaller power value at two points that satisfy a reproducing criterion, the larger and smaller power values being derived based on results of approximating the recording characteristics of the optical recording medium using a plurality of reproduced values obtained by detecting the reproducing characteristics.

2. A recording method for recording information onto an optical recording medium with a recording condition determined based on a result of test recording carried out by irradiating pulsed laser beams onto the medium, wherein the test recording is carried out by changing one or both of the power and pulse width of the laser beams in a stepwise manner, and a range of changing the power, pulse width, or both is determined based on a result of checking recording characteristics prior to the test recording, wherein the recording characteristics are checked by carrying out test recording on the optical recording medium by a plurality of predetermined reference conditions and detecting a result of reproduced characteristics, wherein the range of changing the power is determined based on a difference between a larger power value and a smaller power value at two points that are closest to a reproducing criterion among a plurality of reproduced values obtained by detecting the reproducing characteristics.

3. A recording method for recording information onto an optical recording medium with a recording condition determined based on a result of test recording carried out by irradiating pulsed laser beams onto the medium, wherein the test recording is carried out by changing one or both of the power and pulse width of the laser beams in a stepwise manner, and a range of changing the power, pulse width, or both is determined based on a result of checking recording characteristics prior to the test recording, wherein the recording characteristics are checked by carrying out test recording on the optical recording medium by a plurality of predetermined reference conditions and detecting a result of reproduced characteristics, wherein the range of changing the power is set based on a power value at a pole of change in the reproducing characteristics.

4. A method of defining a recording condition for recording information onto an optical recording medium, said method comprising:

recording test data on said optical medium using a first defined set of test conditions characterized by one or more different laser pulse widths, laser pulse powers, or both;

making a first determination of recording characteristics at said first predefined set of test conditions;

defining a range of different laser pulse powers, laser pulse widths, or both, based at least in part on said first determination;

recording test data on said media using a second set of test conditions within said defined range of pulse powers, pulse widths, or both;

making a second determination of recording characteristics at a plurality of said test conditions within said defined range; and defining a recording condition for recording information onto said optical recording medium based at least in part on said second determination.

5. The method of claim 4, wherein said second set of test conditions is larger than said first set of test conditions.

6. The method of claim 4, wherein the number of test conditions in said second set depends at least in part on said first determination.

7. The method of claim 4, wherein said first set of test conditions is defined by test recordings on a reference optical medium and are stored in an optical drive.

8. The method of claim 7, wherein said optical medium is more sensitive to laser energy than said reference optical medium.

9. The method of claim 7, wherein said optical medium is less sensitive to laser energy than said reference optical medium.

* * * * *

UNITED STATES PATENT AND TRADEMARK OFFICE
CERTIFICATE OF CORRECTION

PATENT NO.        : 7,599,265 B2                                                Page 1 of 1
APPLICATION NO.   : 11/026613
DATED             : October 6, 2009
INVENTOR(S)       : Kakimoto et al.

It is certified that error appears in the above-identified patent and that said Letters Patent is hereby corrected as shown below:

Column 9, line 58, which reads, "coefficient ax", should read -- coefficient $\alpha$ --.

Signed and Sealed this

Fifteenth Day of June, 2010

David J. Kappos
*Director of the United States Patent and Trademark Office*